United States Patent
Malik et al.

(10) Patent No.: US 7,818,375 B2
(45) Date of Patent: Oct. 19, 2010

(54) PROVIDING ADVANCED INSTANT MESSAGING (IM) NOTIFICATION

(75) Inventors: Dale W. Malik, Dunwoody, GA (US); W. Todd Daniell, Marietta, GA (US); Brian K. Daigle, Marietta, GA (US); Douglas B. Watts, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 590 days.

(21) Appl. No.: 10/364,703

(22) Filed: Feb. 10, 2003

(65) Prior Publication Data
US 2004/0078441 A1 Apr. 22, 2004

Related U.S. Application Data

(60) Provisional application No. 60/419,613, filed on Oct. 17, 2002.

(51) Int. Cl.
G06F 15/16 (2006.01)
G06F 15/173 (2006.01)
G06F 3/00 (2006.01)

(52) U.S. Cl. ............... 709/206; 709/204; 709/205; 709/224; 715/758

(58) Field of Classification Search ......... 709/204–207, 709/224; 715/751–758
See application file for complete search history.

(56) References Cited

U.S. PATENT DOCUMENTS

| | | | | |
|---|---|---|---|---|
| 5,990,887 A * | 11/1999 | Redpath et al. | ............ | 715/758 |
| 6,549,937 B1 * | 4/2003 | Auerbach et al. | ........... | 709/206 |
| 6,631,412 B1 * | 10/2003 | Glasser et al. | ............ | 709/224 |
| 6,907,447 B1 * | 6/2005 | Cooperman et al. | ......... | 709/203 |
| 6,990,513 B2 * | 1/2006 | Belfiore et al. | ............ | 709/203 |
| 2002/0083127 A1 * | 6/2002 | Agrawal | ................ | 709/203 |
| 2003/0217096 A1 * | 11/2003 | McKelvie et al. | .......... | 709/202 |
| 2005/0004984 A1 * | 1/2005 | Simpson | ................ | 709/205 |
| 2005/0223069 A1 * | 10/2005 | Cooperman et al. | ......... | 709/206 |

OTHER PUBLICATIONS

Tom Spring, PCWorld:com, AOL Unveils a Slim, Trim ICQ Sep. 30, 2002, PC World, pp. 1 and 2.*
Gwen Harris, WSG Newsletter: Instant Messengers—Who's Online Oct. 26, 2001, Web Search Guide, pp. 1-6.*
Presentation by Paik, Eun Kyoung; Entitled: impp, simple, prim, iptel (CPL), sigtran (SCTP), on Apr. 22, 2002.
By J. Rosenbert; Entitled: A Component Model for SIMPLE, pp. 1-11, Aug. 2002.
By J. Oikarinen, D. Reed; Entitled: Internet Relay Chat Protocol; pp. 1-65, May 1993.
Web Address: www.jabber.org; for: Jabber software Foundation, entitled: Open Instant Messaging Powered by XMPP; pp. 1-3, Apr. 21, 2003.

(Continued)

*Primary Examiner*—David E England
(74) *Attorney, Agent, or Firm*—Thomas, Kayden, Horstemeyer & Risley, LLP

(57) ABSTRACT

Systems and methods for providing advanced instant messaging (IM) notification are provided. In accordance with one embodiment of the invention, an event message, which is received prior sending of an initial message by a user, is used to generate a notification to a contact. The notification indicates to the contact that the user is preparing to initiate a chat session prior to opening a chat window.

41 Claims, 32 Drawing Sheets

OTHER PUBLICATIONS

By R. Osborne, S. Aggarwal, L. Wong, P. Beebee, M. Calsyn, L. Lippert; Entitled: RVP: A Presence and Instant Messaging Protocol; pp. 1-37, Dec. 2000.

By J. Rosenberg, H. Schulzrinne; Entitled: SIP Event Packages for Call Leg and Conference State; pp. 1-23, Sep. 2002.

Web Address: www.ceruleanstudios.com/trillian; pages included: Features Tour (1), Messaging Enhancements (2), Connect to 5 Mediums (2), Interface Overview (1), Features Tour (Screenshots Gallery—Contact List Window) (1) Features Tour (Screenshots Gallery—Sending Pictures) (1), Features Tour (Screenshots Gallery—Messaging Window) (1), Apr. 23, 2003.

* cited by examiner

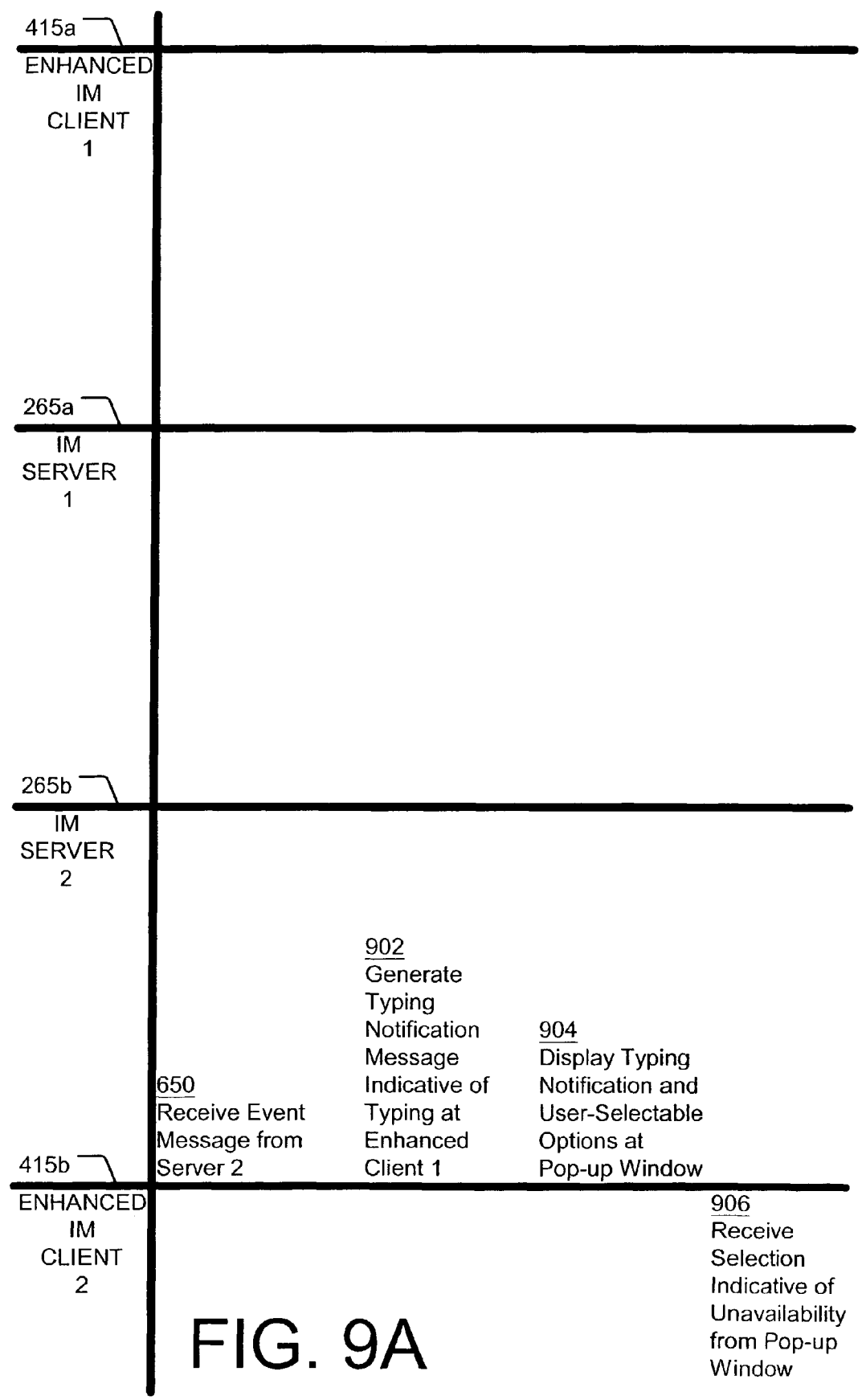

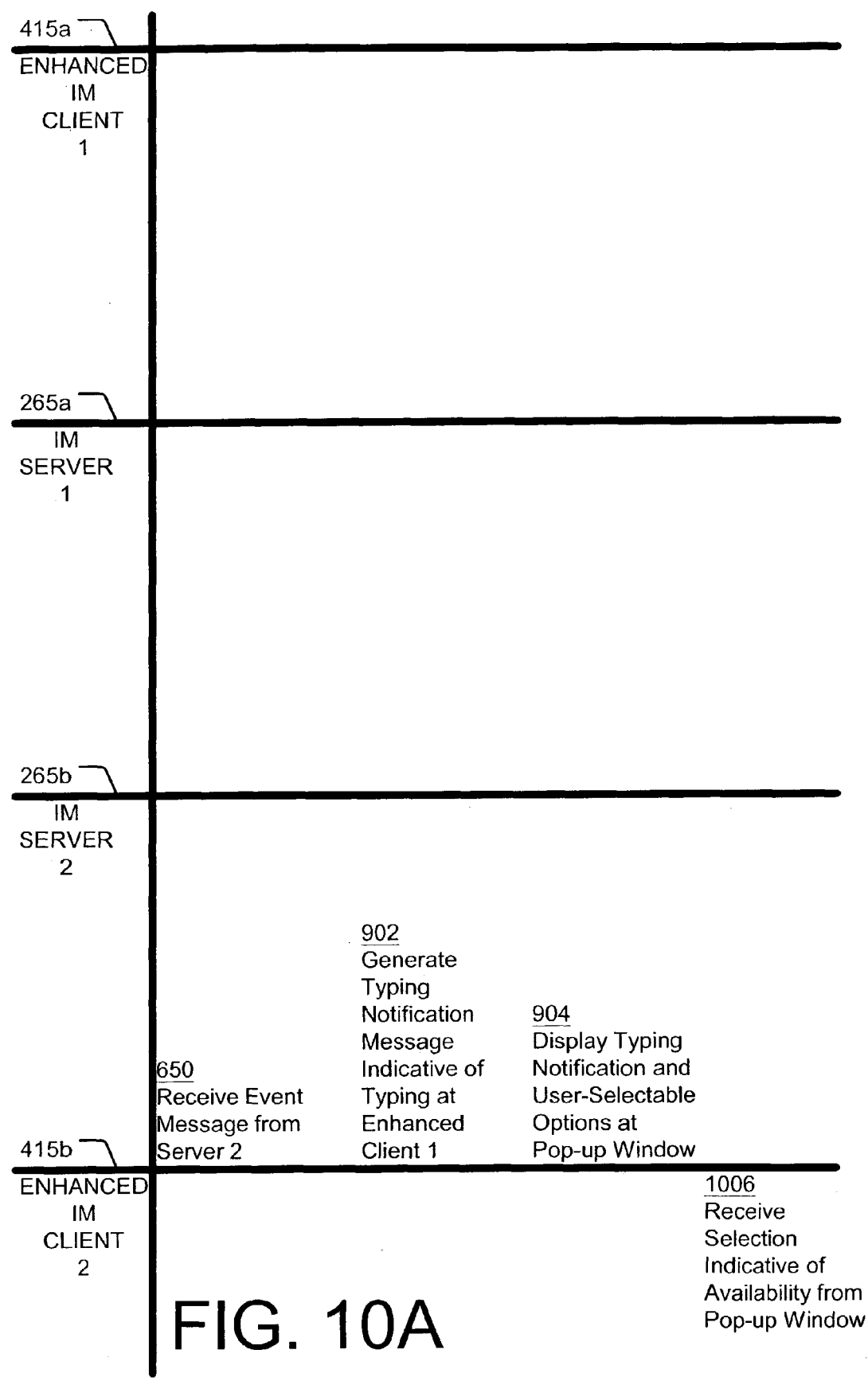

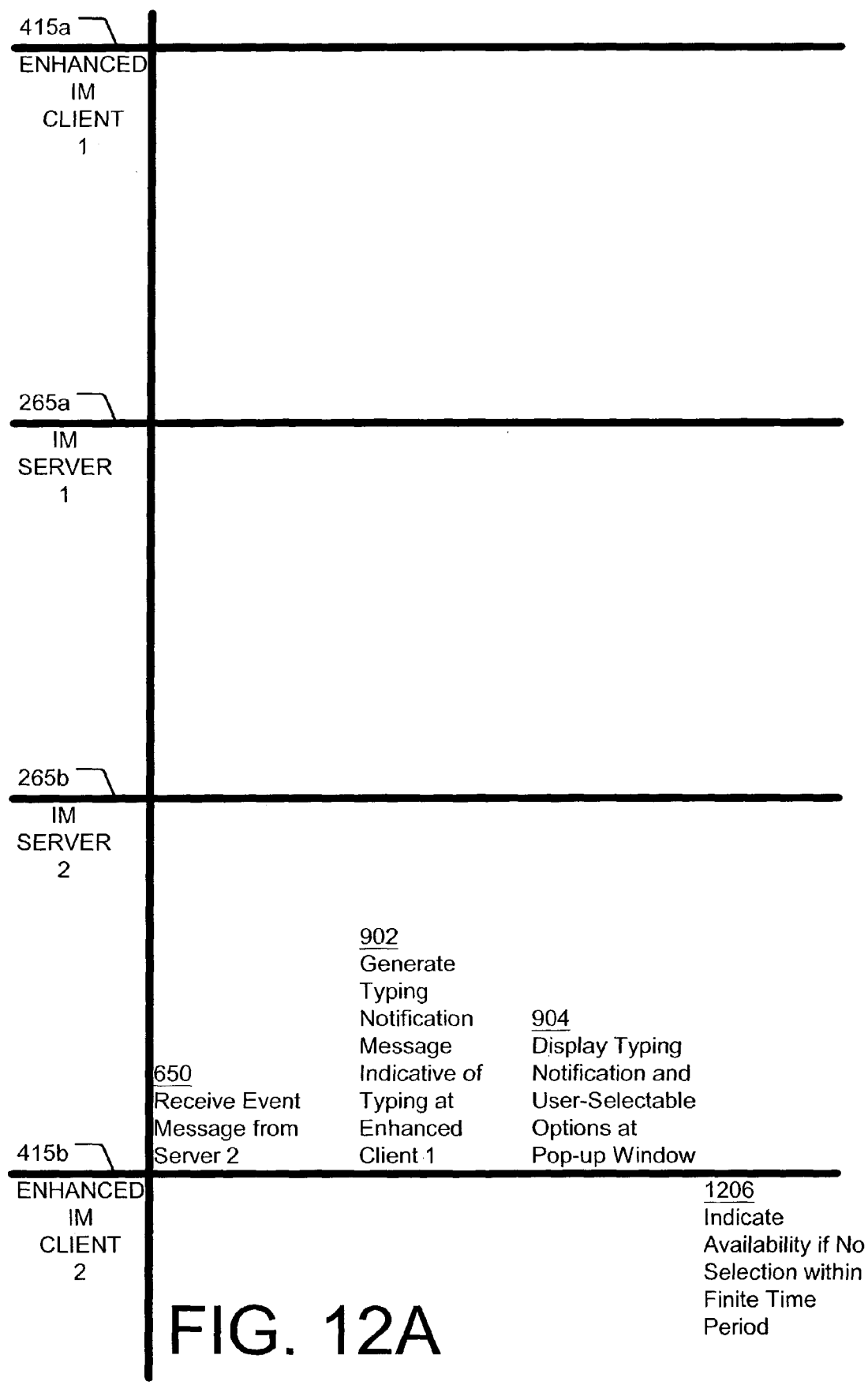

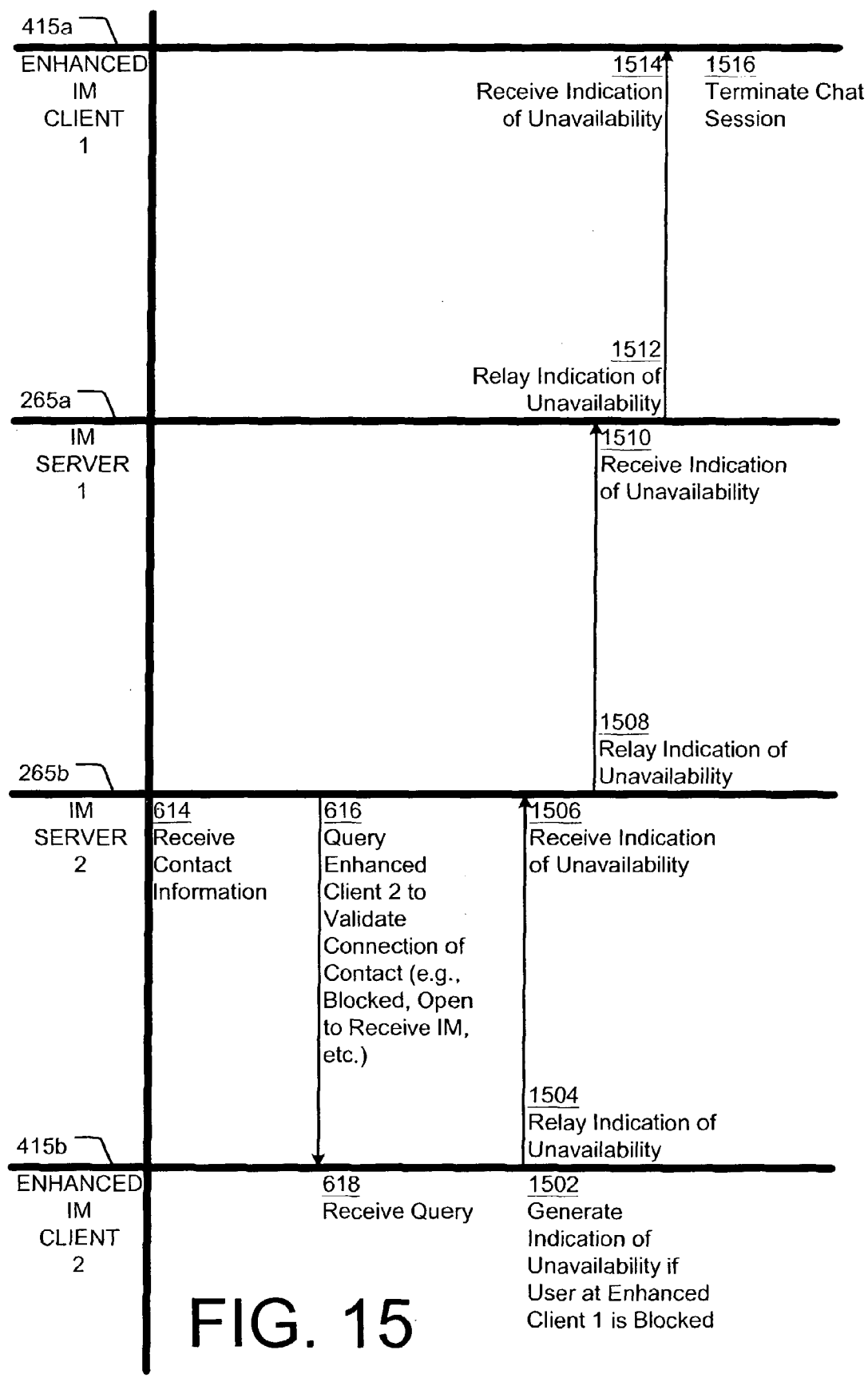

PROVIDING ADVANCED INSTANT MESSAGING (IM) NOTIFICATION

CROSS REFERENCE TO RELATED APPLICATIONS

This application claims the benefit of U.S. provisional patent application Ser. No. 60/419,613, filed Oct. 17, 2002, which is incorporated herein by reference in its entirety.

U.S. patent application Ser. No. 10/274,408, filed Oct. 18, 2002, and U.S. patent application Ser. No. 10/325,268, filed Dec. 19, 2002, are also incorporated herein by reference in their entireties.

FIELD OF INVENTION

The present invention relates generally to the Internet and, more particularly, to systems and methods related to instant messaging (IM).

BACKGROUND

Instant messaging (IM), which is effectively a real-time communication, has drastically altered how individuals communicate over the Internet. Despite advances in IM technology, processes associated with chat session initiation could be improved.

Therefore, it is desirable to have IM systems that have greater functionality.

SUMMARY

The present disclosure provides systems and methods for providing advanced instant messaging (IM) notification.

Briefly described, in architecture, one embodiment of the system comprises logic adapted to receive an event message at a first IM client, and logic adapted to display a notification message at the first IM client in response to receiving the event message. The event message is responsive to a designation of a potential chat session with the first IM client.

The present disclosure also provides methods for providing advanced IM notification. In this regard, one embodiment of the method comprises the steps of receiving an event message at a first IM client, and displaying a notification message at the first IM client in response to receiving the event message. The event message is responsive to a designation of a potential chat session with the first IM client.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 6 through 9B are data flow diagrams showing increased IM functionality related to notification, in accordance with one embodiment of the invention.

FIGS. 6 through 8, 10A, and 10B are data flow diagrams showing increased IM functionality related to notification, in accordance with another embodiment of the invention.

FIGS. 6 through 8, 11A, and 11B are data flow diagrams showing increased IM functionality related to notification, in accordance with another embodiment of the invention.

FIGS. 6 through 8, 12A, and 12B are data flow diagrams showing increased IM functionality related to notification, in accordance with another embodiment of the invention.

FIGS. 6 through 8, 13A, and 13B are data flow diagrams showing increased IM functionality related to notification, in accordance with another embodiment of the invention.

FIGS. 6 through 8, 14A, and 14B are data flow diagrams showing increased IM functionality related to notification, in accordance with another embodiment of the invention.

FIGS. 6 and 15 are data flow diagrams showing increased IM functionality related to notification, in accordance with another embodiment of the invention.

DETAILED DESCRIPTION OF THE PREFERRED EMBODIMENTS

Figure 1A:
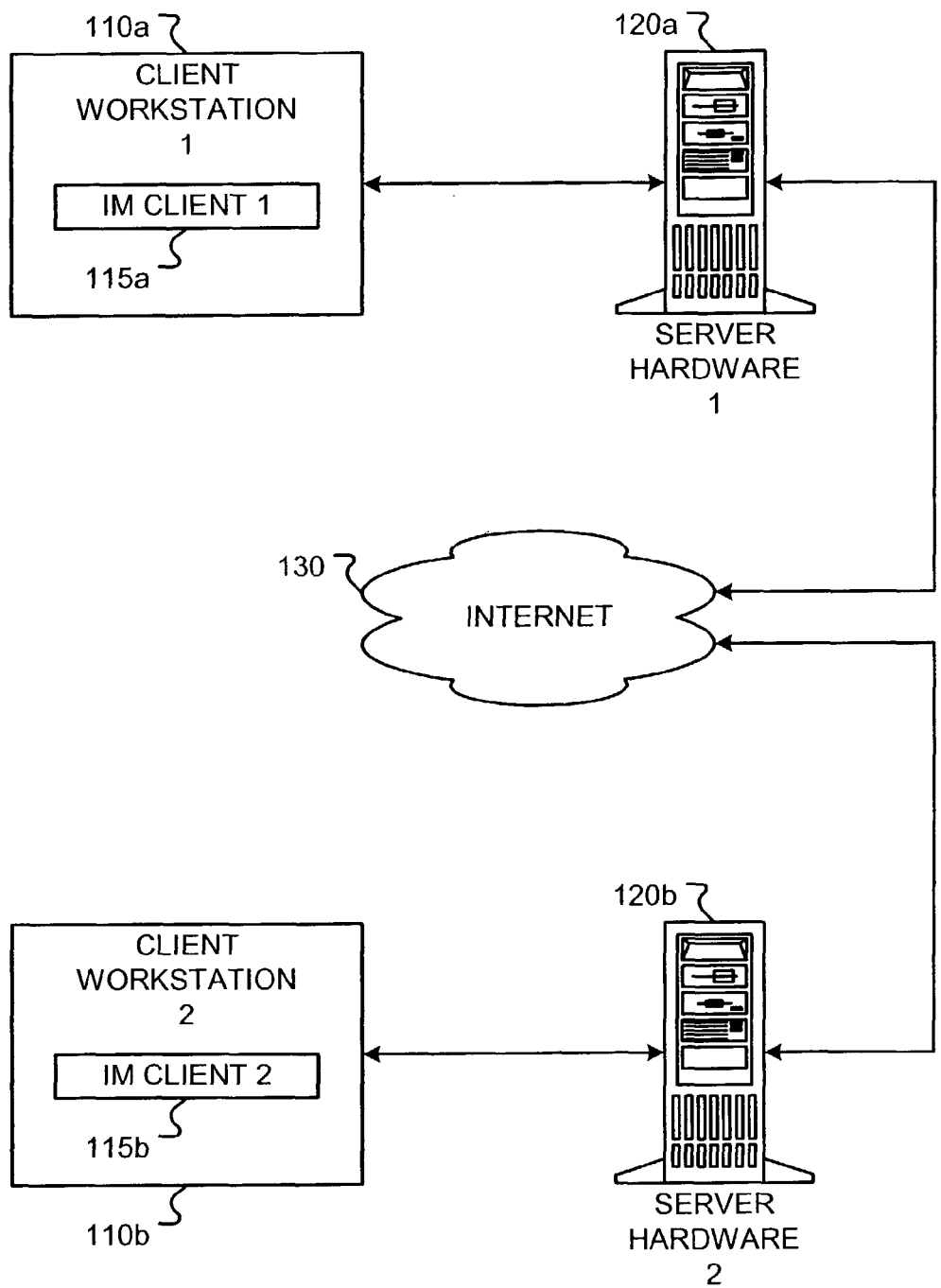
FIGS. 1A through 1C are block diagrams showing several instant messaging (IM) environments.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Instant messaging (IM), which is effectively a real-time communication, has drastically altered how individuals communicate over the Internet. Prior to IM, much of Internet-based communication took place over email or other correspondence-based Internet communications.

Figure 1B:
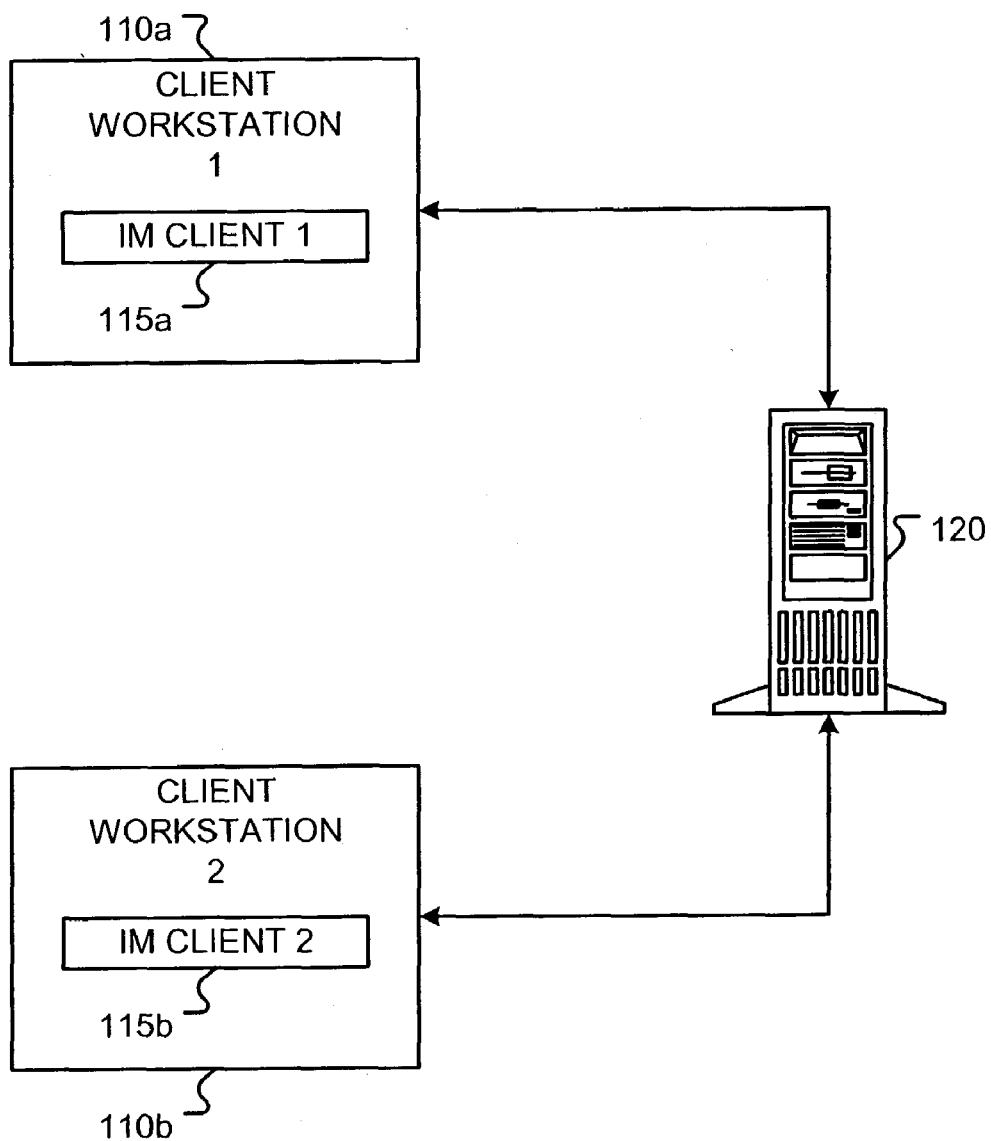
Figure 1C:
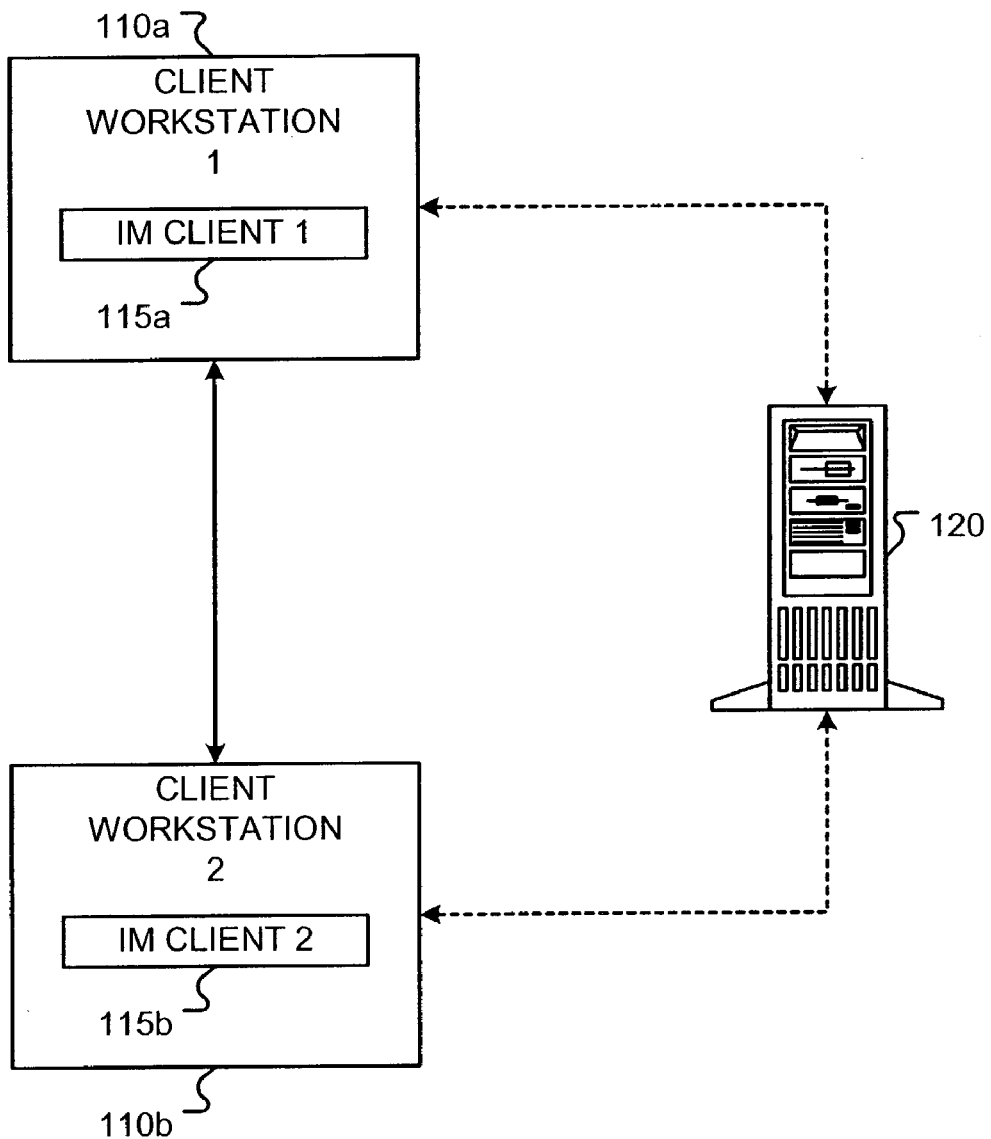

Examples of prior IM systems are shown with reference to FIGS. 1A through 1C. As shown in FIG. 1A, an example IM environment may include client workstations 110a, 110b, which are connected to server hardware 120a, 120b, which are further connected to the Internet 130, thereby permitting communication between the client workstations 110a, 110b over the Internet 130. The client workstations 110a, 110b each have IM clients 115a, 115b running on the client workstations 110a, 110b, thereby permitting IM communications from one client workstation 110a to the other client workstation 110b.

Thus, given a user and a contact, who are logged in at two separate workstations (hereinafter "top IM workstation" 110a and "bottom IM workstation" 110b) each connected to two separate server hardware (hereinafter "top server hardware" 120a and "bottom server hardware" 120b), the process may proceed as follows. Upon receiving a message and a "send" command at the top IM workstation 110a, the top IM client 115a directs the message to the top server hardware 120a, which handles the IM message. Since the IM message includes contact information (e.g., login name, domain name, etc.) of the intended IM recipient, the IM message may properly be routed to the intended recipient by the top server hardware 120a. Depending on the specific protocol (Microsoft, Yahoo, America On-Line, Jabber, etc.), the messages may be handled differently. Since these protocols are known in the art and described in various protocol specifications, specific details related to various IM protocols is omitted here. In any event, upon receiving the IM message from the top client workstation 110a, the top server hardware 120a determines the server at which the contact is logged on. This is done by extracting a domain name from the IM message.

Upon determining that the contact is logged on at the bottom server hardware 120b, a connection is opened across the Internet 130 between the top server hardware 120a and the bottom server hardware 120b if an open connection did not previously exist. Upon opening the connection, the IM message is routed from the top server hardware 120a to the bottom server hardware 120b. The bottom server hardware 120b receives the IM message and delivers the IM message to the bottom client workstation 110b. The IM message is then displayed to the contact by the bottom IM client 115b running on the bottom client workstation 110b.

IM messages from the contact are conveyed in similar fashion. In other words, IM messages from the bottom IM client 115b are cascaded through the bottom client workstation 110b, the bottom server hardware 120b, the Internet 130, the top server hardware 120b, the top client workstation 110a, and displayed to the user by the top IM client 115a. As shown in FIG. 1A, the IM communications take place through a server-to-server communication pathway.

In addition to IM text messages, other messages, such as event messages, may be conveyed from one IM client 110a to another IM client 110b through the server-to-server communication pathway. One example of conventional event message transmissions is shown below with reference to FIGS. 3A through 3F.

FIG. 1B shows another environment in which IM messages may be exchanged between a user and a contact. In the environment of FIG. 1B, both the user and the contact are logged in at the same server hardware 120. In this regard, given a user and a contact, who are logged in at a top IM workstation 110a and bottom IM workstation 110b, respectively, the process may proceed as follows. Upon receiving a message and a "send" command at the top IM workstation 110a, the top IM client 115a directs the message to the server hardware 120, which handles the IM message. Since the IM message includes contact information of the intended IM recipient, the IM message may properly be routed to the intended recipient by the server hardware 120. Upon receiving the IM message from the top client workstation 110a, the server hardware 120 determines the server at which the contact is logged on. This is done by extracting a domain name from the IM message. Since, in the environment of FIG. 1B, the contact is logged on at the same server as the user, the IM message is routed from the server hardware 120 to the bottom client workstation 110b. The IM message is then displayed to the contact by the bottom IM client 115b running on the bottom client workstation 110b.

IM messages from the contact are conveyed in similar fashion. In other words, IM messages from the bottom IM client 115b are cascaded through the bottom client workstation 110b, the server hardware 120, the top client workstation 110a, and displayed to the user by the top IM client 115a. As shown in FIG. 1B, the IM communication is directed from client to client through a server.

In addition to IM text messages, other messages, such as event messages, may be conveyed from one IM client 110a to another IM client 110b in the environment of FIG. 1B.

FIG. 1C shows another environment in which client-to-client communications (rather than server-mediated communications) may take place. In this regard, once addresses (e.g. Internet protocol (IP) addresses, etc.) of both client workstations 110a, 110b have been determined by the server hardware 120, and these addresses have been conveyed to the IM clients 115a, 115b at the client workstations 110a, 110b, IM messages may be directly conveyed from one client workstation 110a to the other client workstation 110b. One example of client-to-client communication is described in RFC 2543, which describes Session Initiation Protocol (SIP) and is known by those skilled in the art.

Thus, in client-to-client environments similar to that of FIG. 1C, an IM message from the top IM client 115a is directly conveyed to the bottom IM client 115b without being directed through an intermediary server hardware 120. In addition to IM text messages, other messages, such as event messages, may be conveyed from one IM client 110a to another IM client 110b through the server-to-server communication pathway.

Figure 2A:
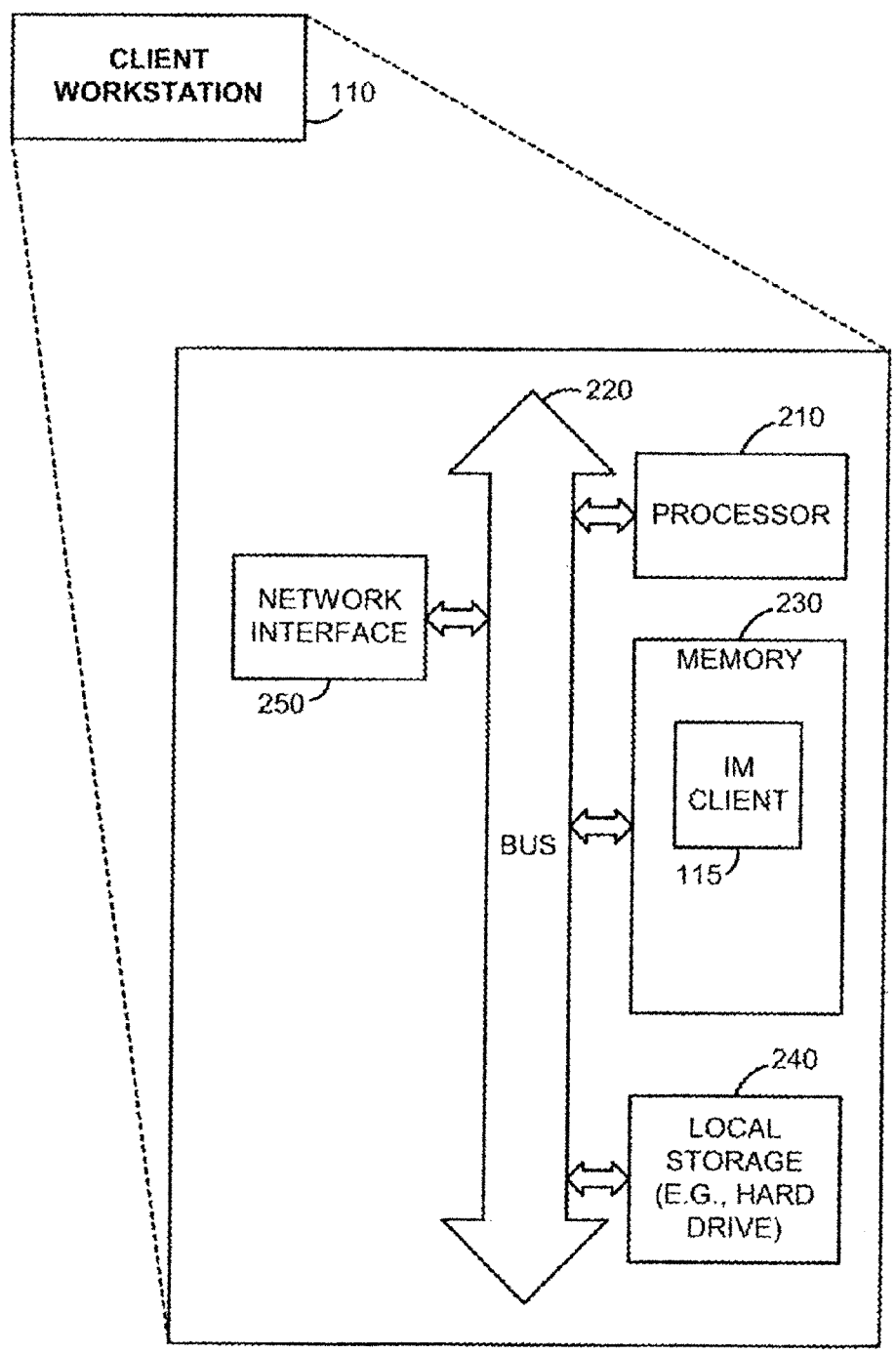
FIG. 2A is a block diagram showing component architecture of an example client workstation.

FIG. 2A is a block diagram showing component level architecture of an example client workstation 10. As shown in FIG. 2A, the client workstation 110 comprises a system board that includes a processor 210, a network interface 250, a memory 230, a local storage device 240, and a bus 220 that permits communication between the various components. In one example, the local storage device 240 may be a hard drive configured to electronically store data. The local storage device 240 may also store computer programs that execute on the client workstation 110. In this sense, the processor 210 is configured to access any program that is stored on the local storage device 240, and execute the program with the assistance of the memory 230. As shown in FIG. 2A, the memory 230, in one embodiment, includes an IM client 115. Since the functioning of computing devices is well known in the art, further discussion of the processor 210, the memory 230, and the local storage device 240 are omitted here. While the various components are shown as residing on a single system board, it will be clear to one of ordinary skill in the art that the various components may reside at different locations, so long as they are coupled to each other to allow communication between the components.

The network interface 250 of FIG. 2A is configured to provide an interface between the client workstation 110 and the server hardware 120. Thus, the network interface 250 provides the interface for the client workstation 110 to receive any data that may be entering from the server hardware 120 and, also, to transmit any data from the client workstation 110 to the server hardware 120. In this regard, the network interface 250 may be a modem, a network card, or any other interface that interfaces the client workstation 110 to a network.

Figure 2B:
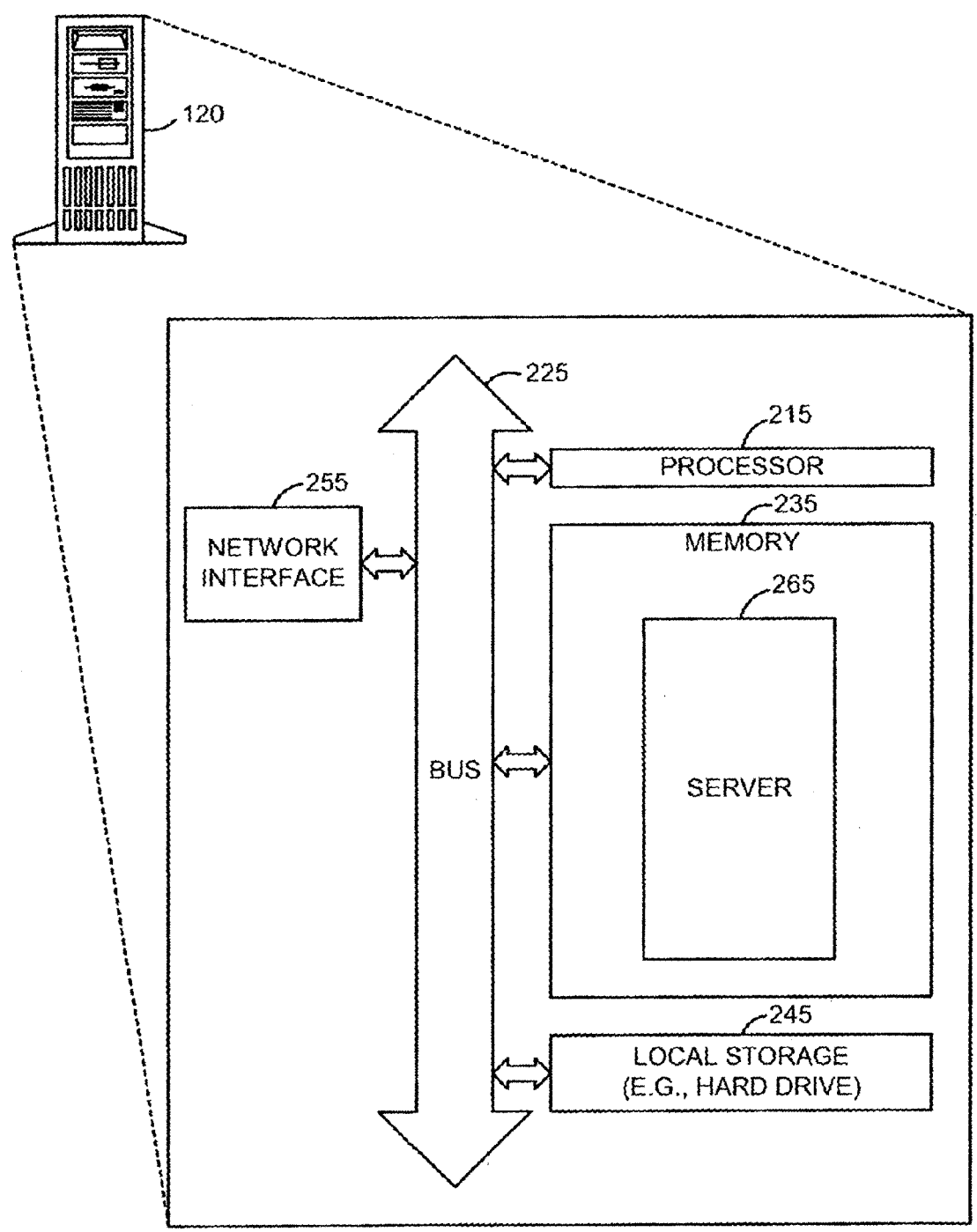
FIG. 2B is a block diagram showing component architecture of an example server hardware.

FIG. 2B is a block diagram showing component level architecture of example server hardware 120. As shown in FIG. 2B, the server hardware 120 comprises a system board that includes a processor 215, a network interface 255, a memory 235, a local storage device 245, and a bus 225 that permits communication between the various components. In one example, the local storage device 245 may be a hard drive configured to electronically store data. The local storage device 245 may also store computer programs that execute on the server hardware 120. In this sense, the processor 215 is configured to access any program that is stored on the local storage device 245, and execute the program with the assistance of the memory 235. As shown in FIG. 2B, the memory 230 includes a server 265 and various server components (not shown), which are adapted to provide IM routing functions as is known in the art. Since the functioning of computing devices is also well known in the art, further discussion of the processor 215, the memory 235, and the local storage device 245 are omitted here. While the various components are shown as residing on a single system board, it will be clear to one of ordinary skill in the art that the various components may reside at different locations, so long as they are coupled to each other to allow communication between the components.

The network interface 255 of FIG. 2B is configured to provide an interface between the server hardware 120 and the server hardware 120. Thus, the network interface 255 provides the interface for the server hardware 120 to receive any data that may be entering from the client workstation 110 and, also, to transmit any data from the client workstation 110 to the server hardware 120. In this regard, the network interface 255 may be a modem, a network card, or any other interface that interfaces the server hardware 120 to a network.

FIGS. 3A through 3F are data flow diagrams showing IM functionality related to event messages in IM clients 115a, 155b. Specifically, FIGS. 3A through 3F show data flow diagrams related to event messages in a server-to-server environment similar to FIG. 1A, between a top IM client 115a and a bottom IM client 115b.

Figure 3A:
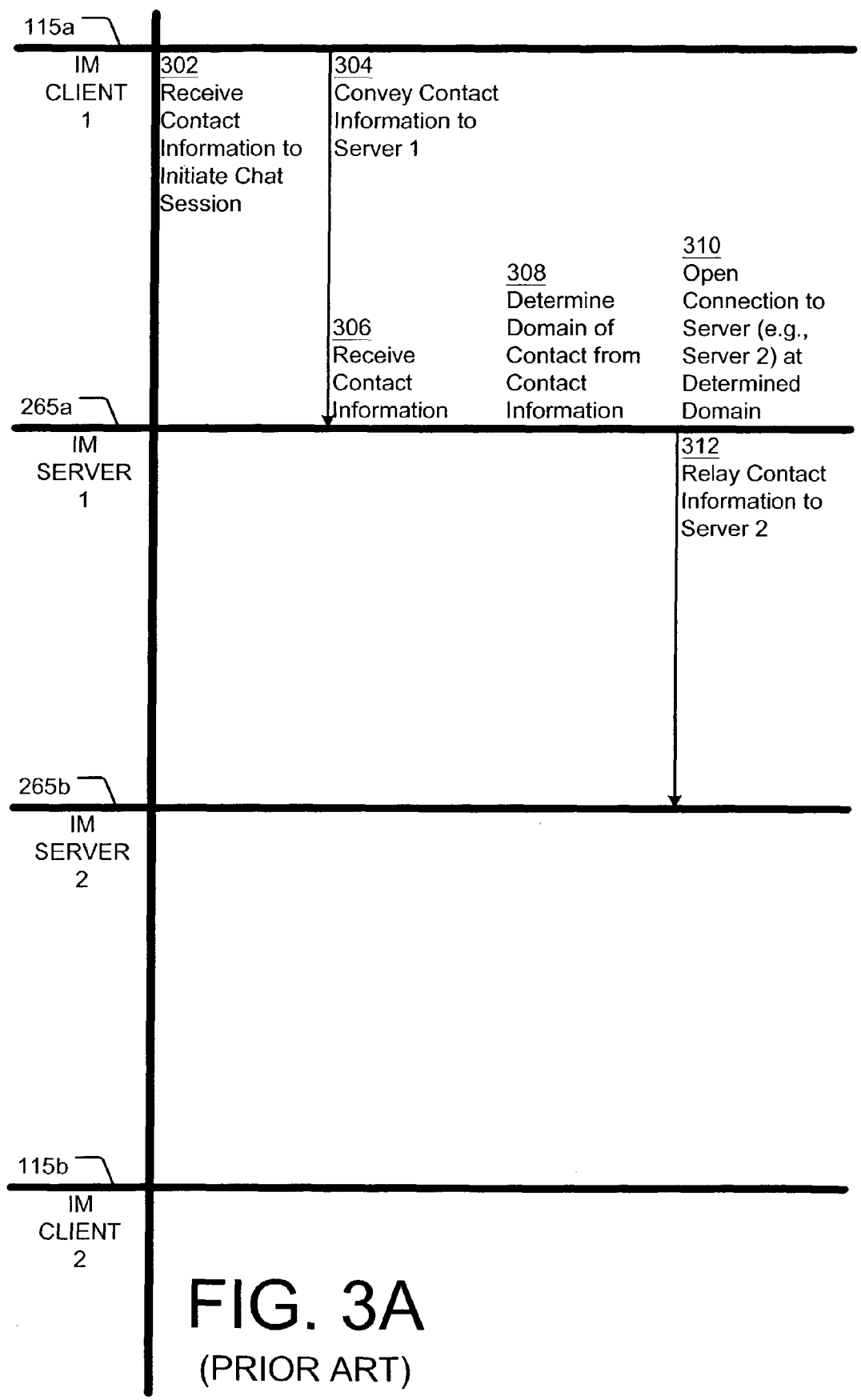
FIGS. 3A through 3F are data flow diagrams showing IM functionality related to event messages.

As shown in FIG. 3A, contact information is received (302) by the top IM client 115a at which an IM session is initiated. In one example, the contact information is received (302) by the top IM client 115a when a user selects a contact from an IM contact list (e.g., an address book, a "buddy list," etc.). The contact information is conveyed (304) from the top IM client 115a to the top IM server 265a that is in communication with the top IM client 115a. The top IM server 265a receives (306) the contact information from the top IM client 115a and determines (308), from the contact information, a server domain name where the contact is located. Since protocols for determining (308) the proper server from contact information is known in the art and described in various IM protocol specifications, further discussion of proper server determination is omitted here. In any event, upon determining (308) that the proper IM server is the bottom IM server 265b, the top IM server 265a opens (310) a connection to the bottom IM server 265b. Once the connection is opened (310) between the top IM server 265a and the bottom IM server 265b, the contact information is relayed (312) from the top IM server 265a to the bottom IM server 265b.

Figure 3B:
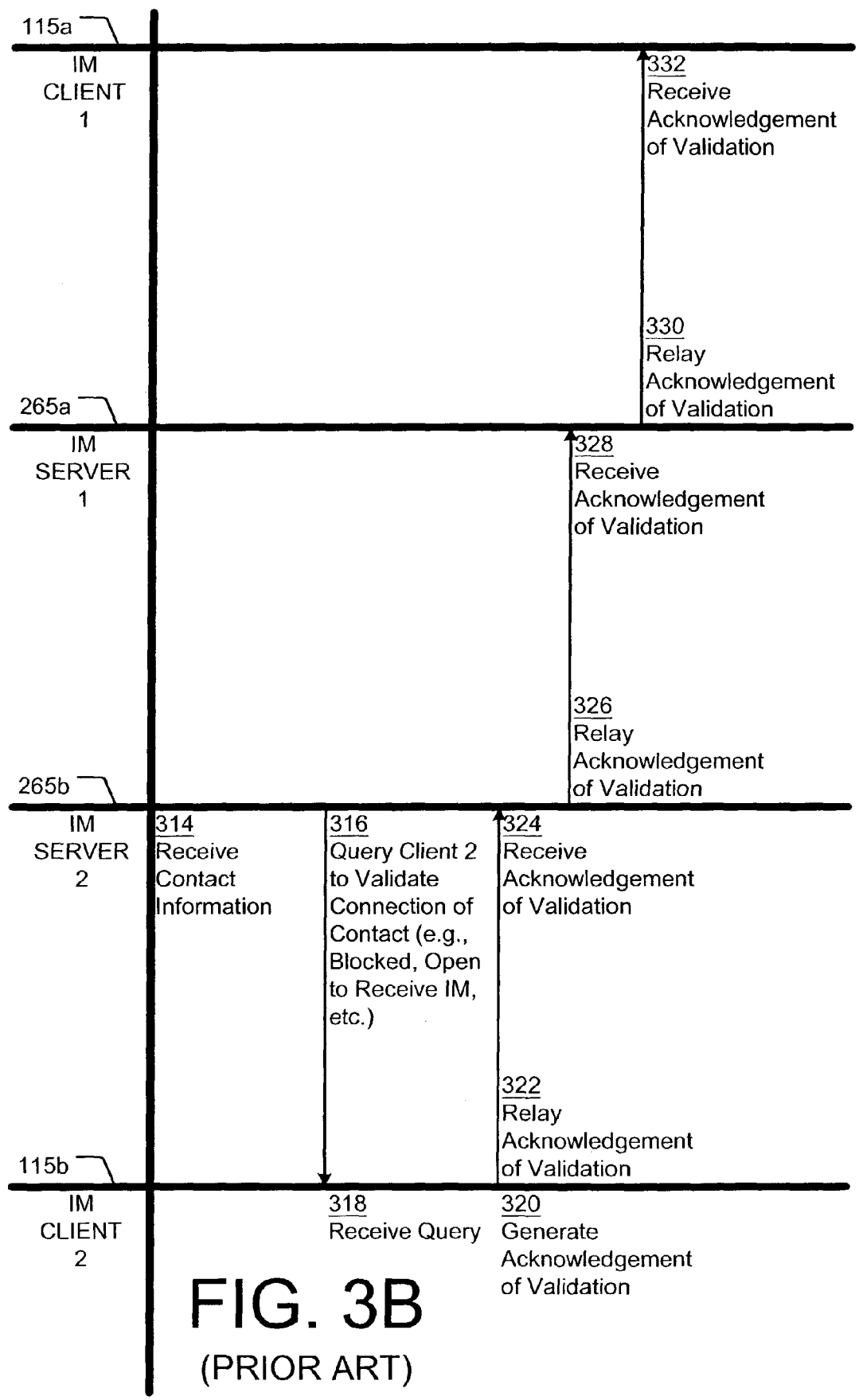

The process continues in FIG. 3B, where the bottom IM server 265b receives (314) the contact information and queries (316) the bottom IM client 115b in order to validate that the contact is logged on at the bottom IM client 115b. The bottom IM client 115b receives (318) the query and generates (320) an acknowledgement of the validation. The acknowledgement is relayed (322) from the bottom IM client 115b to the bottom IM server 265b. The bottom IM server 265b receives (324) the acknowledgement and further relays (326) the acknowledgement to the top IM server 265a. The top IM server 265a receives (328) the acknowledgement from the bottom IM server 265b and relays (330) the acknowledgement to the top IM client 115, which receives (332) the acknowledgement.

Figure 3C:
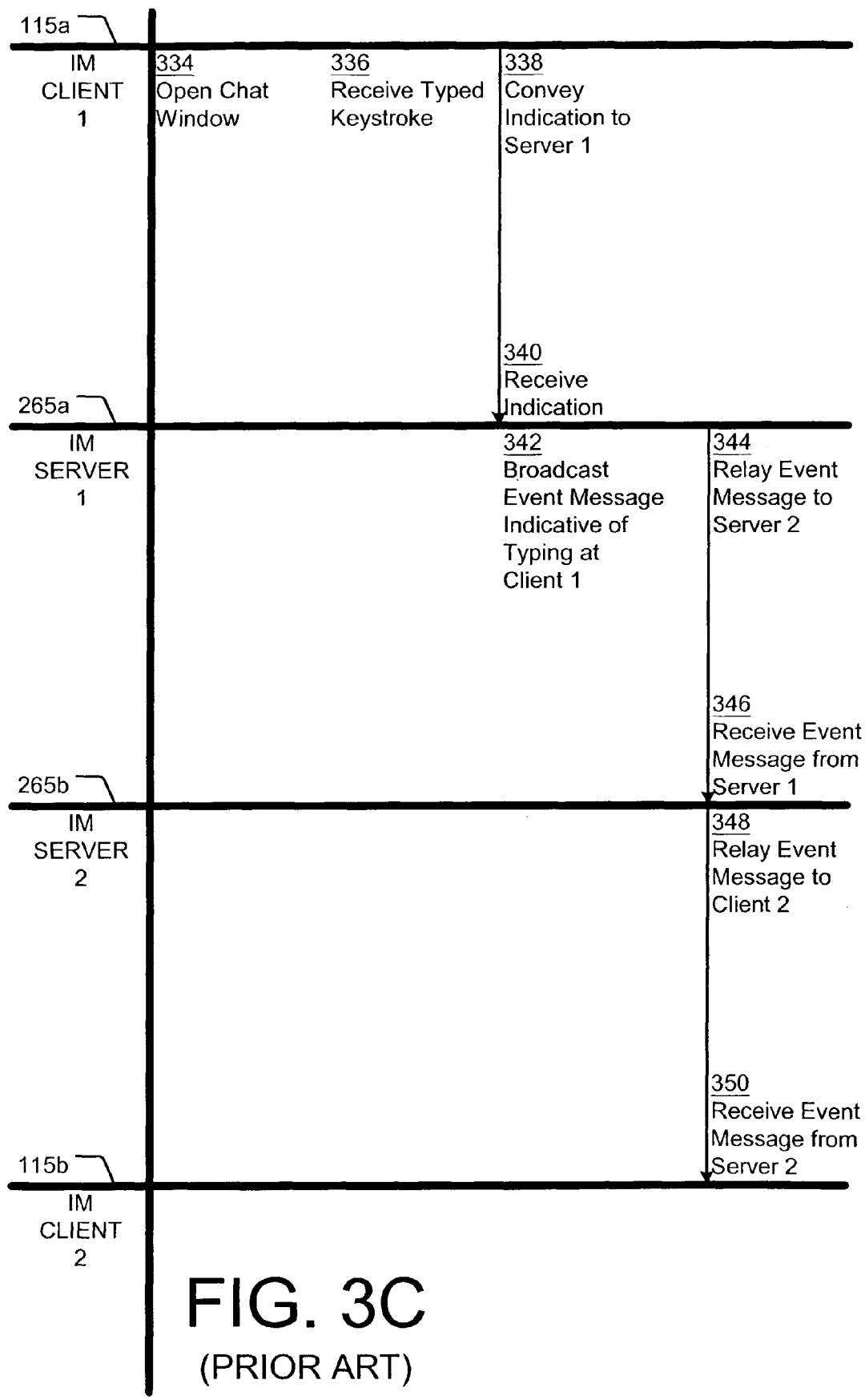

Continuing to FIG. 3C, upon receiving (332) the acknowledgement, the top IM client 115a opens (334) an IM chat window. When the user at the top IM client 115a begins typing an IM message, the typed keystrokes are received (336) by the top IM client 115a, and an indication reflective of the typing is conveyed (338) to the top IM server 265a. In one example, the indication is a signal that indicates a change in a text buffer at the IM chat window. For example, the indication may indicate that the text buffer at the IM chat window has changed from empty (or null) to not empty (non-null). In any event, the conveyed (338) indication is received (340) at the top IM server 265a. Upon receiving (340) the indication, an event message, which is indicative of typing at the top client 115a, is broadcast (342) by the top IM server 265a. Since the event message is an unsolicited broadcast message, the event message is relayed (344) to the bottom IM server 265b without any request or query from the bottom IM server 265b. The bottom IM server 265b receives (346) the event message and relays (348) the event message to the bottom IM client 115b, which typically does nothing more than receive (350) the event message from the bottom IM server 265b.

Figure 3D:
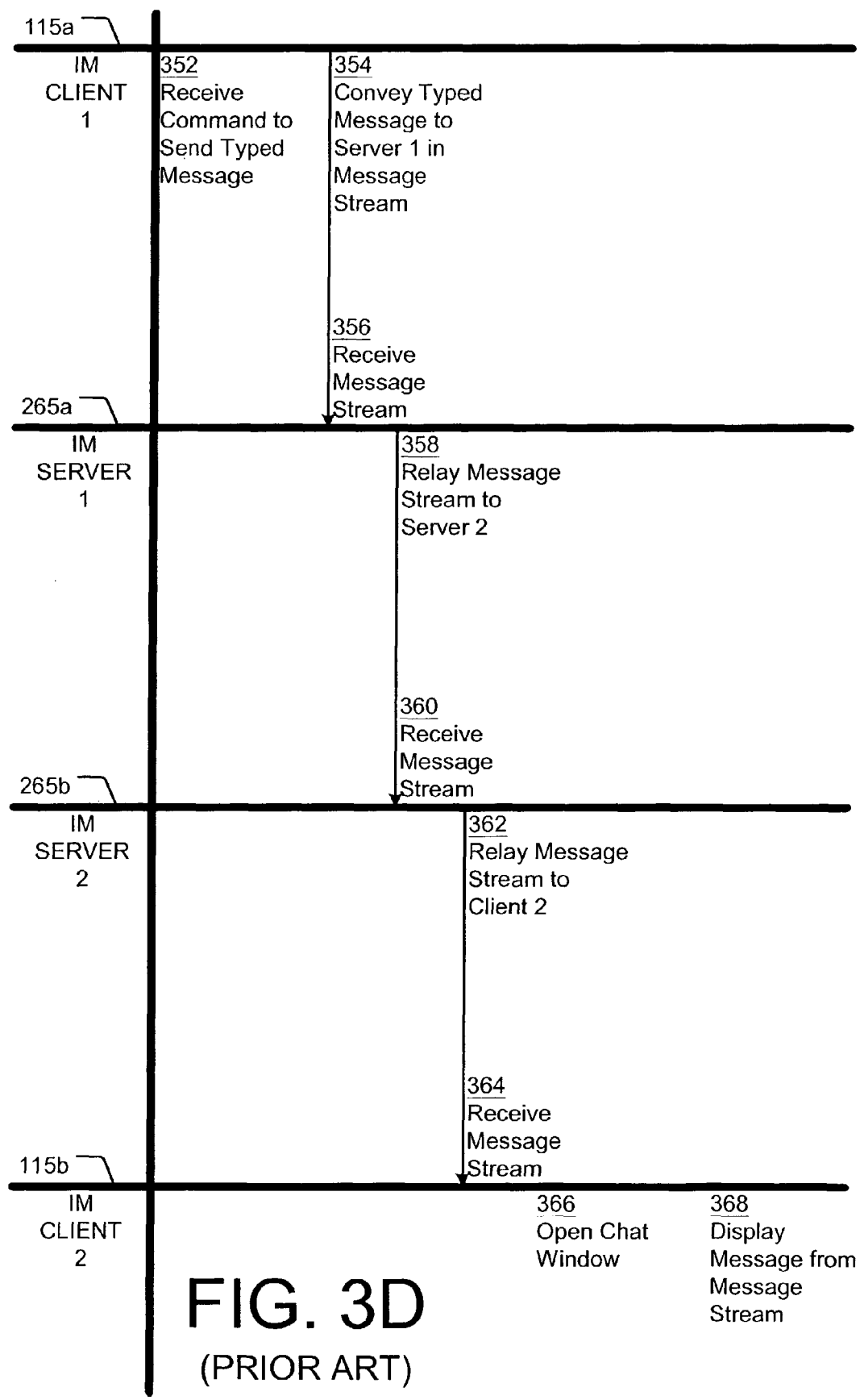

As shown in FIG. 3D, once the user at the top IM client 115a has finished typing a message, the user may enter a "send" command (or in other environments, simply enter a carriage-return). The "send" command is received (352) at the top IM client 115a, which conveys (354) the typed message to the top IM server 265a in a message stream in response to the received (352) "send" command. The top IM server 265a receives (356) the message stream and relays (358) the message stream to the bottom IM server 265b. The bottom IM server 265b receives (360) the message stream and further relays (362) the message stream to the bottom IM client 115b. The bottom IM client 115b receives (364) the message stream and opens (366) a chat window in response to the received (364) message stream. Upon opening (366) the chat window, the message from the message stream is displayed (368) to the contact by the top IM client 115b.

Figure 3E:
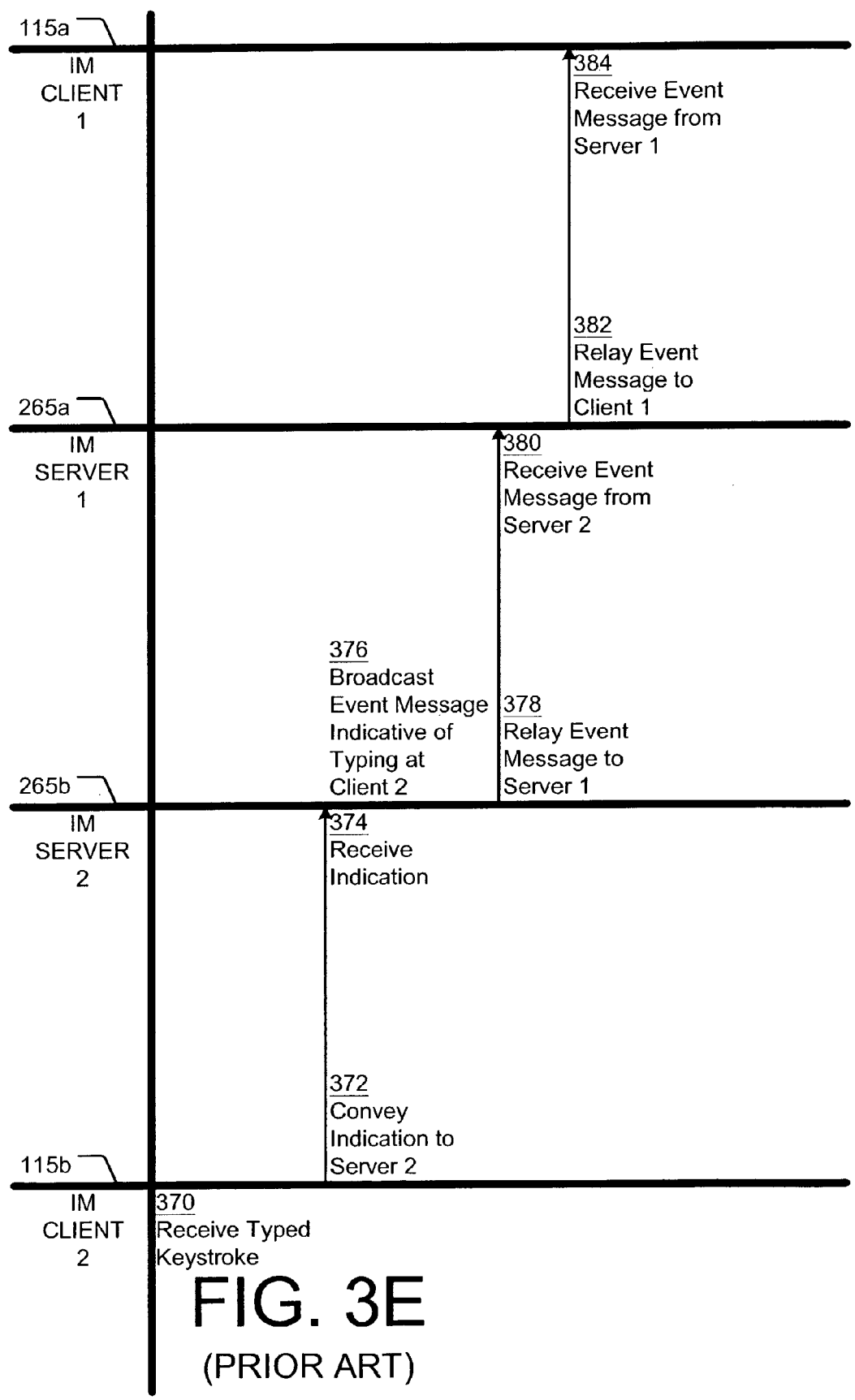
Figure 3F:
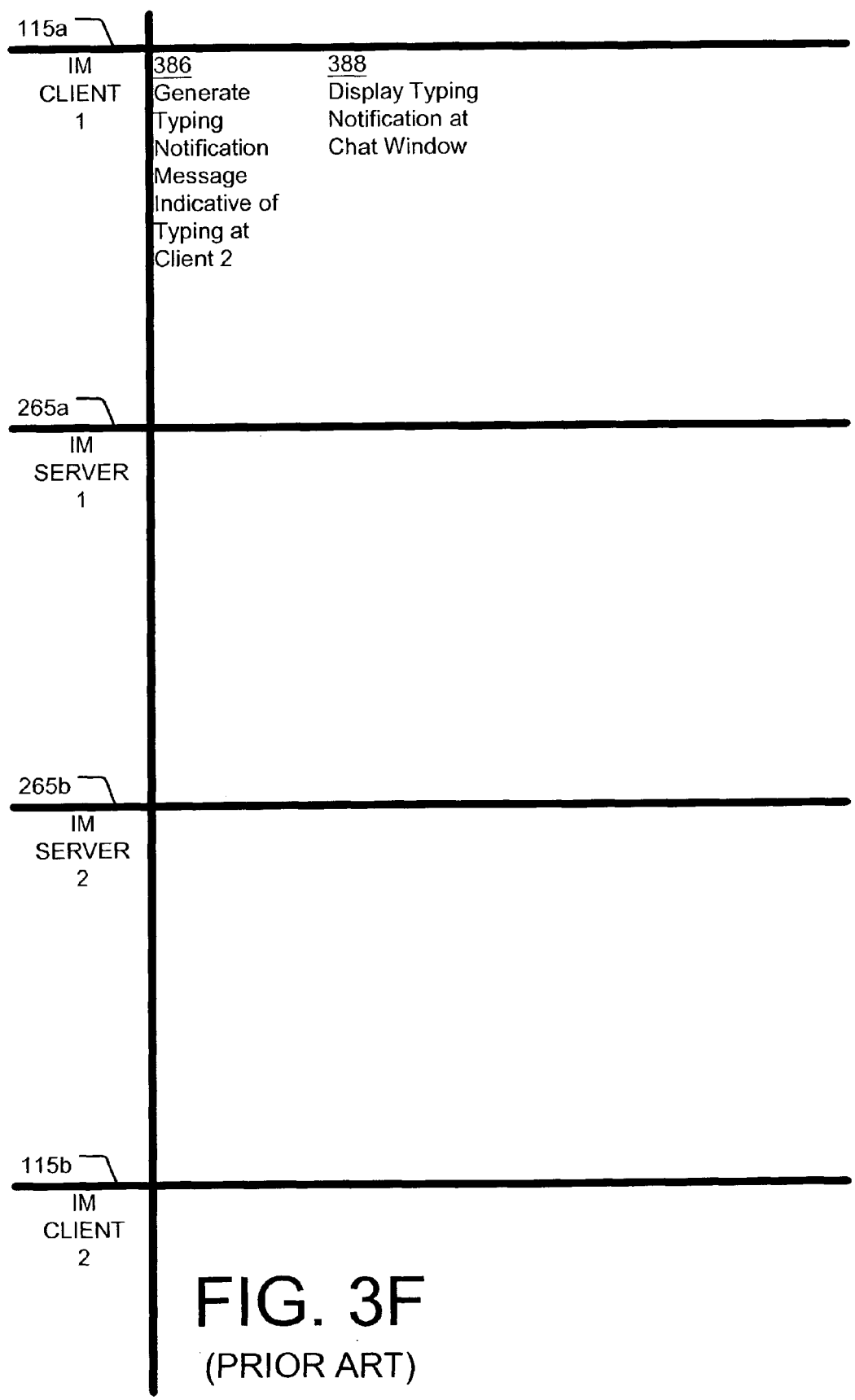

If the contact at the bottom IM client 115b types a reply to the user, the typed keystrokes are received (370) at the bottom IM client 115b. This is shown in FIG. 3E. An indication, which reflects typing at the bottom IM client 115b, is conveyed (372) to the bottom IM server 265b. In one example, the indication is a signal that indicates a change in a text buffer at the IM chat window. For example, the indication may indicate that the text buffer at the IM chat window has changed from empty (or null) to not empty (non-null). In any event, the conveyed (372) indication is received (374) at the bottom IM server 265b. Upon receiving (374) the indication, an event message indicative of typing at the bottom client 115b is broadcast (376) by the bottom IM server 265b. Since the event message is, again, an unsolicited broadcast message, the event message is relayed (378) to the top IM server 265a without any request or query from the top IM server 265a. The top IM server 265a receives (380) the event message and relays (382) the event message to the top IM client 115a, which receives (384) the event message from the top IM server 265a. Unlike the initial broadcast event message, which is received (350) by the bottom IM client 115b and ignored, the reply broadcast message is used by the top IM client 115a to generate (386) a reply typing notification, which is displayed (388) to the user at the top IM client 115a. This is shown in FIG. 3F. The reply-typing notification is indicative of typing at the bottom client 115b. In other words, the reply-typing notification indicates to the user that the contact at the bottom client 115b is typing a reply message to the user.

As seen from the example of FIGS. 3A through 3F, the reply typing notification provides added functionality in IM systems. However, this added functionality only appears as a result of IM chat windows being opened by both the user and the contact. Thus, unless an IM chat window is open at both the user and the contact IM clients 115a, 115b, neither the user nor the contact are aware of any typing activity by the other.

Figure 4A:
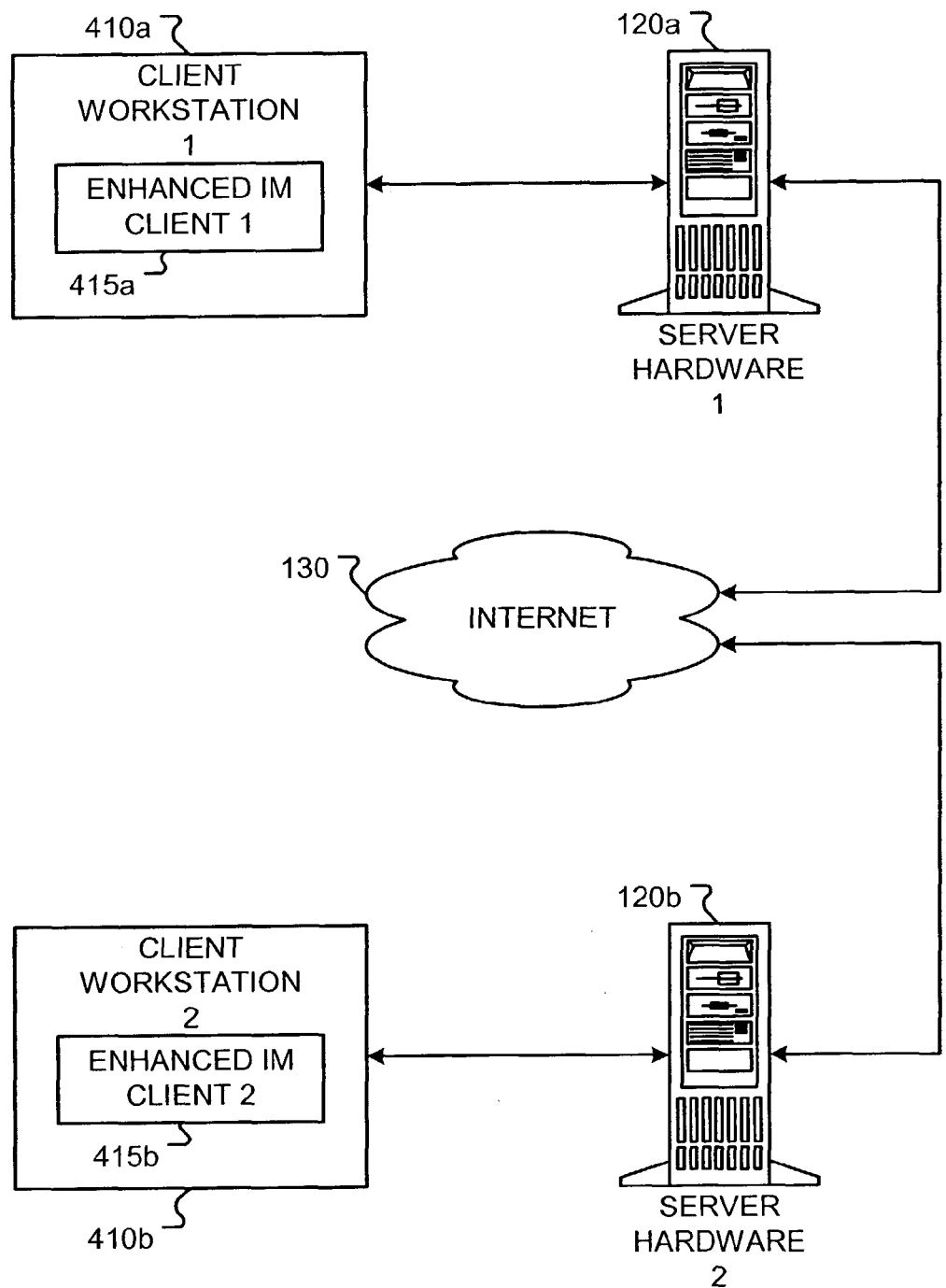
FIGS. 4A and 4B are block diagrams showing IM environments, in accordance with several embodiments of the invention.
Figure 4B:
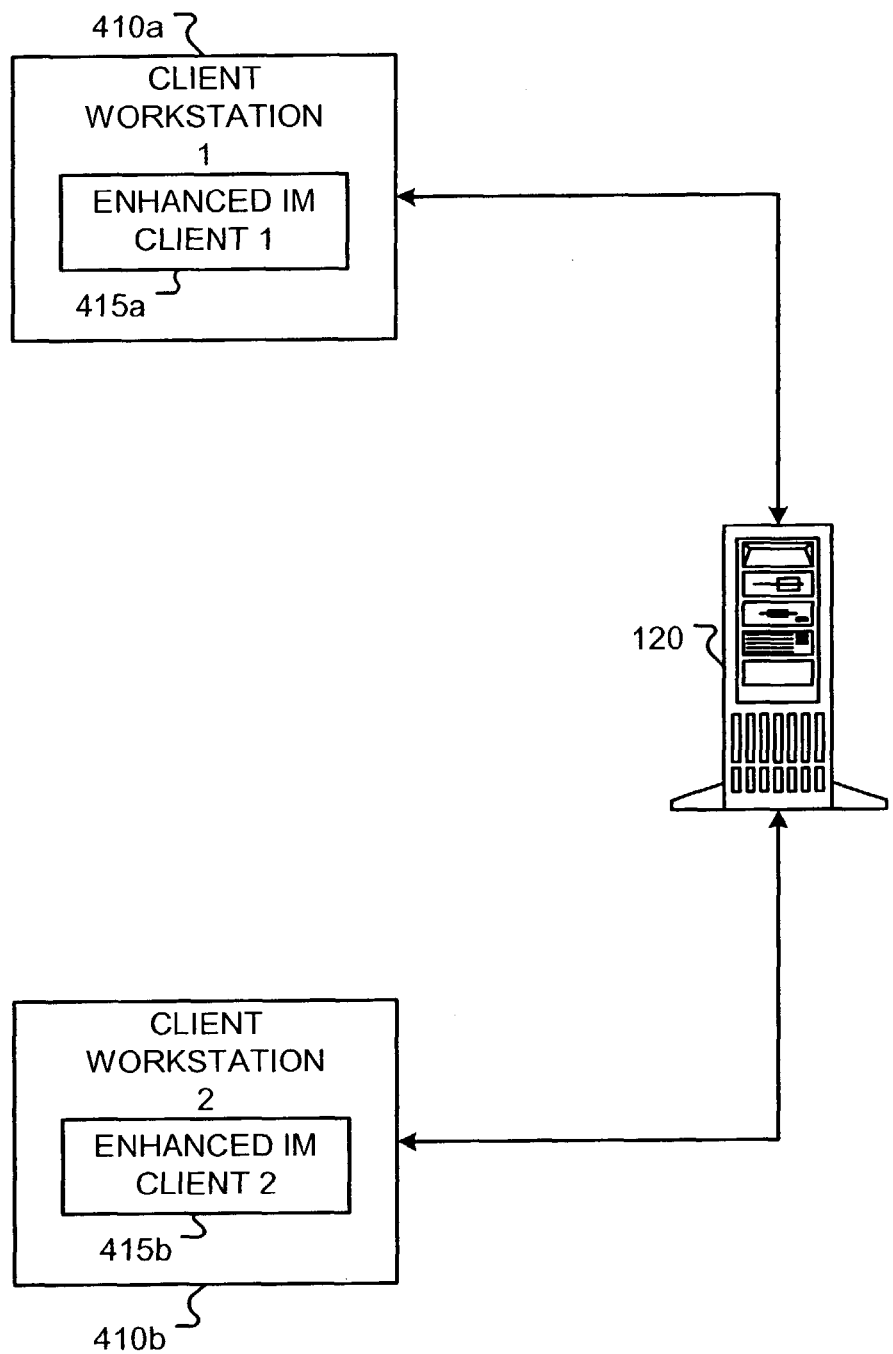

FIGS. 4A and 4B are block diagrams showing instant messaging (IM) environments, in accordance with several embodiments of the invention. As shown in FIG. 4A, one embodiment of an IM system includes client workstations 410a, 410b, which are connected to server hardware 120a, 120b, which are further connected to the Internet 130. In a preferred embodiment, the client workstations 410a, 410b each have enhanced IM clients 415a, 415b running on the client workstations 410a, 410b, thereby permitting enhanced IM communications between the client workstations 410a, 410b.

Thus, given a user and a contact, who are logged in at two separate workstations (hereinafter "user IM workstation" 410a and "contact IM workstation" 410b), each connected to two separate server hardware systems (hereinafter "user server hardware" 120a and "contact server hardware" 120b), the process may proceed as follows. When the user chooses to send an IM message to a contact, the user may select a contact from a list of contacts (e.g. an address book, a "buddy list," etc.) at an enhanced IM client 415a of the user (hereinafter "enhanced user IM client" 415a). Additionally, the user may type in contact information at an input box provided by the enhanced user IM client 415a.

The selection of the contact (or entry of contact information) results in a validation of contact availability (e.g., correct IM address, correct domain, etc.) at the enhanced IM client 415b of the contact (hereinafter "enhanced contact IM client" 415b). In one embodiment, the selection of the contact may be a selection of the contact name from a list of contacts such as, for example, a "buddy list." In this regard, the selection of the contact may include highlighting a name from a list and selecting a chat-initiation button. In another embodiment, the selection of the contact may include an opening of a chat window. Given the embodiment of FIG. 4A, the validation process involves a server-to-server communication in which validation and acknowledgement messages are exchanged between the enhanced user IM client 415a and the enhanced contact IM client 415b through both the user server hardware 120a and the contact server hardware 120b. The validation process is described in greater detail with reference to FIGS. 6 and 7.

Preferably, upon validating the contact availability, after the user begins typing a message in a new chat window at the enhanced user IM client 415a, a typing notification message (or other notification message such as, for example, a chat-initiation message) is displayed to the contact at the enhanced contact IM client 415b. The typing notification message (or other notification message) is displayed at the enhanced contact IM client 415b prior to opening an IM chat window (either as a minimized window, maximized window, or a resized window) at the enhanced contact IM client 415b. In response to the typing notification message, the contact is provided options by the enhanced contact IM client 415b on how to handle the incoming IM message. Thus, as seen from FIG. 4A, unlike conventional IM systems, a typing notification message is displayed to a contact prior to opening an IM chat window at the enhanced contact IM client 415b. Several embodiments of processes related to the typing notification message are discussed in greater detail with reference to FIGS. 8 through 15.

As shown in FIG. 4B, another embodiment of an IM system includes client workstations 410a, 410b, which are connected to the same server hardware 120. The client workstations 410a, 410b each have enhanced IM clients 415a, 415b running on the client workstations 410a, 410b, thereby permitting IM communications from one client workstation 410a to the other client workstation 410b.

Thus, given a user and a contact, who are logged in at a user IM workstation 410a and a contact IM workstation 410b, respectively, the process may proceed as follows. When the user chooses to send an IM message to a contact, the user may select a contact from a list of contacts (e.g., an address book, a "buddy list," etc.) at an enhanced user IM client 415a. Additionally, the user may type in contact information at an input box provided by the enhanced user IM client 415a.

The selection of the contact (or entry of contact information) results in a validation of contact availability (e.g., correct IM address, correct domain, etc.) at the enhanced contact IM client 415b. Given the embodiment of FIG. 4B, the validation process is handled by one server hardware 120.

Upon validating the contact availability, a new chat window is opened, and after the user begins typing a message at the enhanced user IM client 415a, a typing notification message is displayed to the contact at the enhanced contact IM client 415b. The typing notification message is preferably displayed at the enhanced contact IM client 415b prior to opening an IM chat window at the enhanced contact IM client 415b. In response to the typing notification message, the contact is provided options by the enhanced contact IM client 415b on how to handle the incoming IM message. Thus, as seen from FIG. 4B, unlike conventional IM systems, a typing notification message is displayed to a contact prior to opening an IM chat window.

Figure 5:
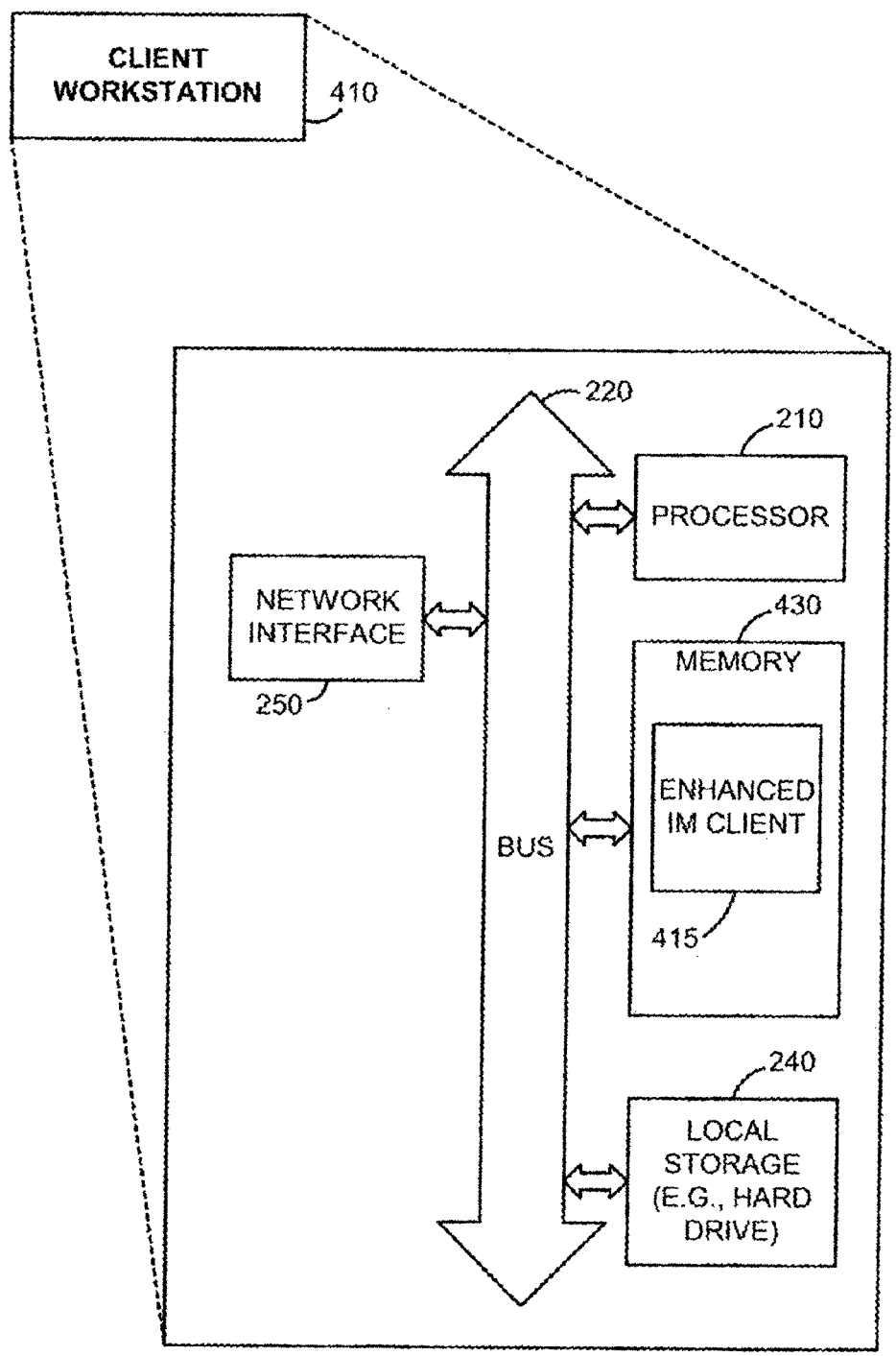
FIG. 5 is a block diagram showing component architecture of a client workstation having an enhanced IM client, in accordance with one embodiment of the invention.

FIG. 5 is a block diagram showing a component architecture of a client workstation 410 having an enhanced IM client 415, in accordance with one embodiment of the invention. As shown in FIG. 5, the client workstation 410 comprises a system board that includes a processor 210, a network interface 250, a memory 430, a local storage device 240, and a bus 220 that permits communication between the various components. In one example, the local storage device 240 may be a hard drive configured to electronically store data. The local storage device 240 may also store computer programs that execute on the client workstation 410. In this sense, the processor 210 is configured to access any program that is stored on the local storage device 240, and execute the program with the assistance of the memory 430. As shown in FIG. 5, the memory 430, in one embodiment, includes an enhanced IM client 415. Since the functioning of computing devices is well known in the art, further discussion of the processor 210, the memory 430, and the local storage device 240 are omitted here. While the various components are shown as residing on a single system board, it will be clear to one of ordinary skill in the art that the various components may reside at different locations, so long as they are coupled to each other to allow communication between the components.

The network interface 250 of FIG. 5 is configured to provide an interface between the client workstation 410 and the server hardware 120. Thus, the network interface 250 provides the interface for the client workstation 410 to receive any data that may be entering from the server hardware 120 and, also, to transmit any data from the client workstation 410 to the server hardware 120. In this regard, the network interface 250 may be a modem, a network card, or any other interface that interfaces the client workstation 410 to a network. Embodiments of client workstations are shown in greater detail in U.S. patent application Ser. Nos. 10/274,408 and 10/325,268, which are incorporated herein by reference in their entireties.

FIGS. 6 through 9B are data flow diagrams showing increased IM functionality related to typing notification, in accordance with one embodiment of the invention. The process begins in FIG. 6 when a user enters contact information to an enhanced user IM client 415*a* to initiate a chat session. In one embodiment, the user may enter the contact information (e.g., contact login name, domain name, etc.) by selecting a contact from a contact list (e.g., address book, "buddy list," etc.). In another embodiment, the user may enter the contact information in an input box provided by the enhanced user IM client 415*a*. In any event, the enhanced user IM client 415*a* receives (602) the contact information and conveys (604) the contact information to a user IM server 265*a*. The user IM server 265*a* receives (606) the contact information and determines (608) the appropriate server at which the contact may be located from the domain name in the contact information. Upon determining (608) the contact IM server 265*b*, a connection is opened (610) to the contact IM server 265*b* by the user IM server 265*a*, and the contact information is relayed (612) to the contact IM server 265*b*.

Figure 7:
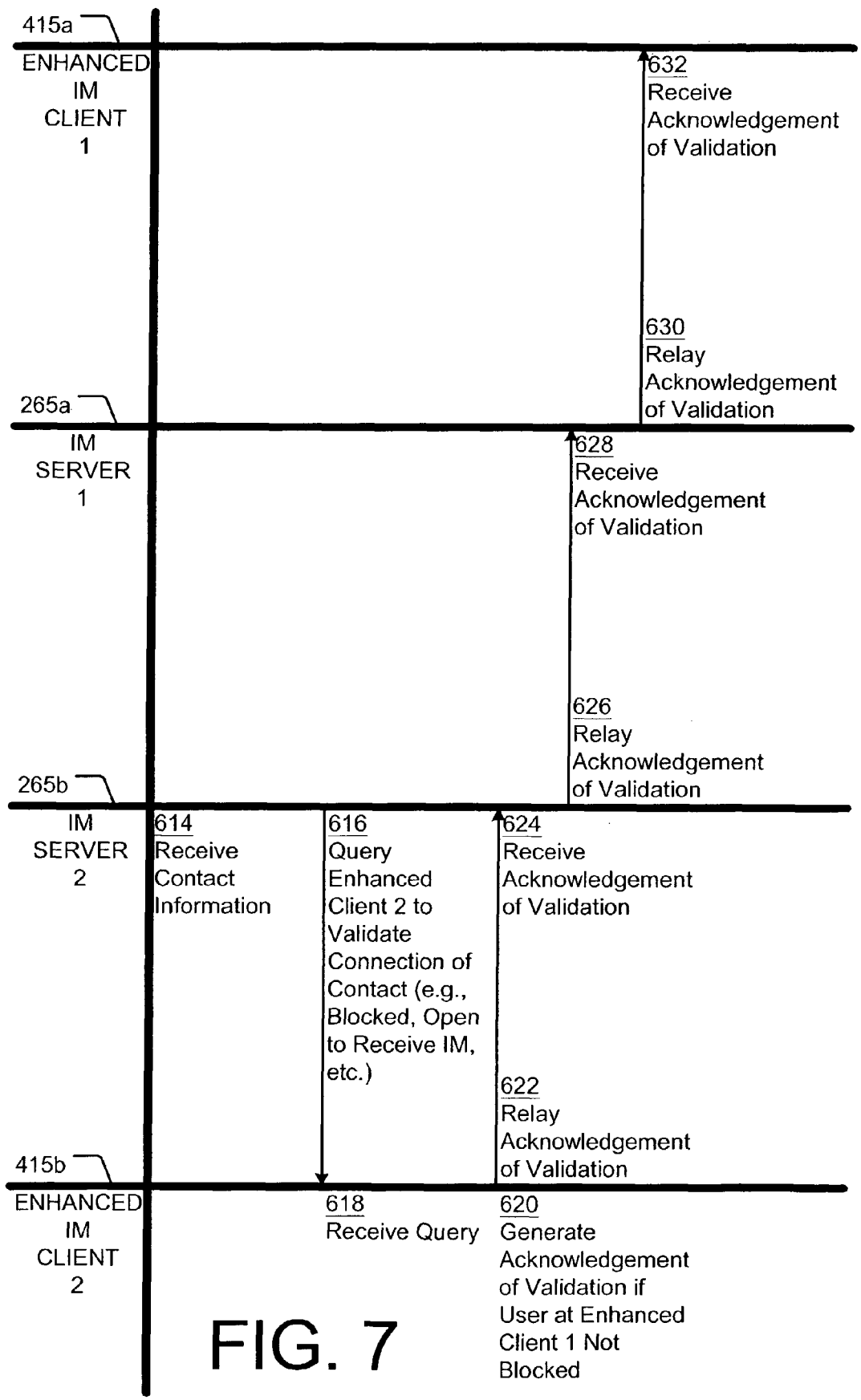

Continuing in FIG. 7, the contact IM server 265*b* receives (614) the contact information and queries (616) an enhanced contact IM client 415*b* in order to validate connection of the contact (e.g., whether the contact is open to receiving IM messages, whether the user is blocked by the contact, etc.). The enhanced contact IM client 415*b* receives (618) the query and generates (620) an acknowledgement of validation if the user at the enhanced user IM client 415*a* is not blocked by the enhanced contact IM client 415*b*. The alternative embodiment in which the user is blocked is described below with reference to FIG. 15.

Upon generating (620) the acknowledgement of validation, the enhanced contact IM client 415*b* relays (622) the acknowledgement to the contact IM server 265*b*. The contact IM server 265*b* receives (624) the acknowledgement and relays (626) the acknowledgement to the user IM server 265*a*. The user IM server 265*a* receives (628) the acknowledgement and further relays (630) the acknowledgement to the enhanced user IM client 415*a*, which receives (632) the acknowledgement of validation.

Figure 8:
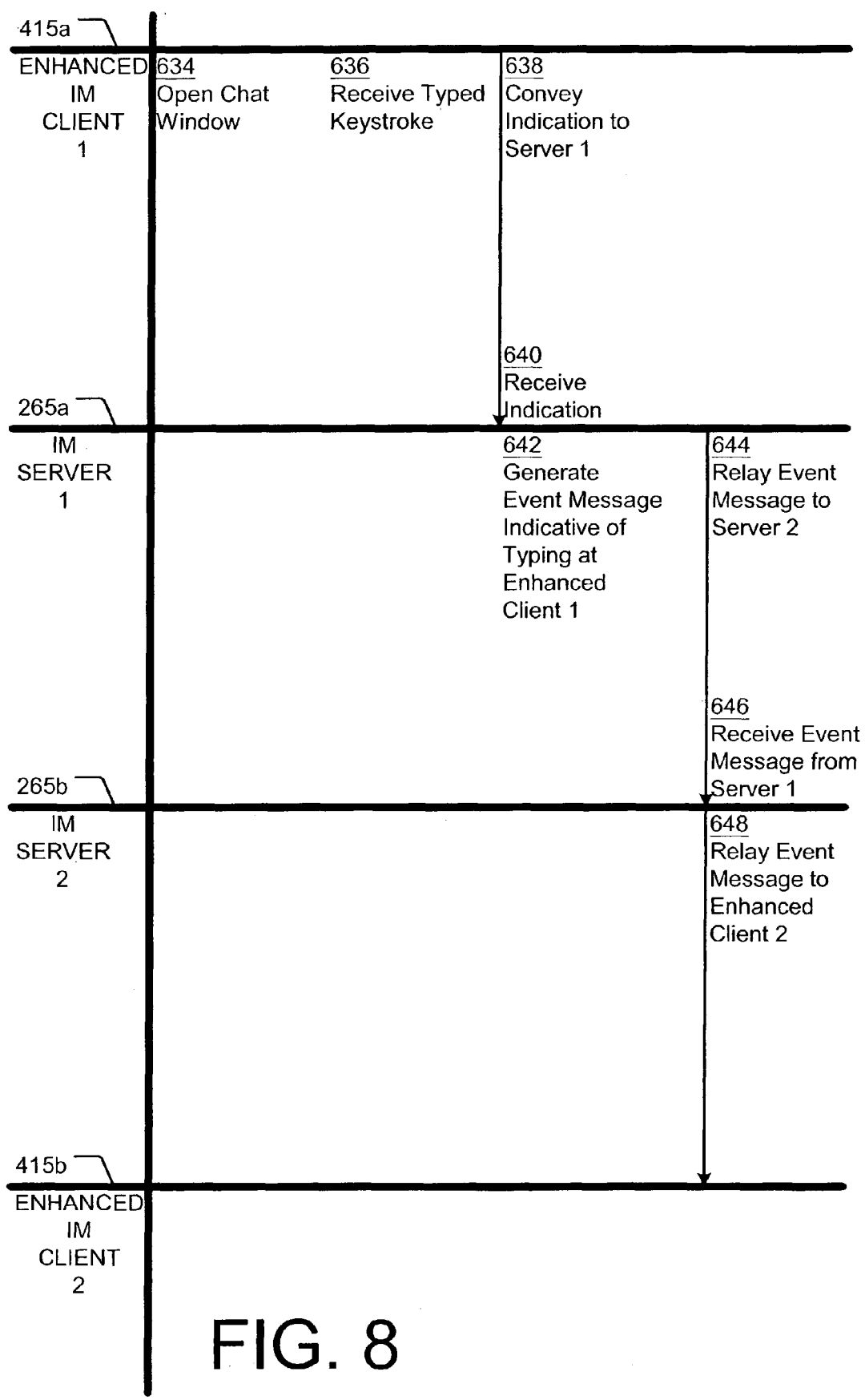

The process continues in FIG. 8, where the enhanced user IM client 415*a*, in response to receiving (632) the acknowledgement, opens (634) an IM chat window. Once the IM chat window has been opened (634) and the user begins typing a message at the IM chat window, the typed keystrokes are received (636) at the enhanced user IM client 415*a*. In response to receiving (636) the typed keystrokes, an indication, which reflects typing at the enhanced IM client, is conveyed (638) by the enhanced user IM client 415*a* to the user IM server 265*a*. The user IM server 265*a* receives (640) the indication and generates (642) an event message. The event message is indicative of the typing at the enhanced user IM client 415*a*. Since the event message is an unsolicited message (e.g., a broadcast message), it is relayed (644) to the contact IM server 265*b* without any prompting or request by the contact IM server 265*b*. The event message is received (646) by the contact IM server 265*b*, which relays (648) the event message to the enhanced contact IM client 415*b*.

Continuing in FIG. 9A, the enhanced contact IM client 415*b* receives (650) the event message from the contact IM server 265*b* and generates (902) a typing notification message, which is indicative of typing at the enhanced user IM client 415*a*. The generated (902) typing notification message is displayed (904) to the contact preferably as a pop-up window (or using a different mechanism) at the enhanced contact IM client 415*b*. In one embodiment, the pop-up window may appear identical to a chat window without the text of a chat message displayed at the chat window. The pop-up window, in a preferred embodiment, includes an identification of the user at the user IM client 415*a*, such as, for example, an IM address. Additionally, the pop-up window may include a message that the user at the IM client 415*a* has at least designated the contact for a chat message and, preferably, a message that indicates that the user is typing a message or is attempting to start a chat session with the contact. The pop-up window may also include user-selectable options such as, for example, an option to ignore IM chat messages from the user at the enhanced user IM client 415*a*, an option to establish an IM chat session with the enhanced user IM client 415*a*, an option to change the contact's status to indicate unavailability, and any other option that a developer may wish to include in the enhanced contact IM client 415*b*. If, for example, the contact selects the option to ignore IM chat messages from the user at the enhanced user IM client 415*a*, then the enhanced contact IM client 415*b* receives (906) the selection from the pop-up window, which indicates that the contact is unavailable to receive the IM message. It should be appreciated that other embodiments may provide additional options or may provide fewer options at the pop-up window.

Figure 9B:
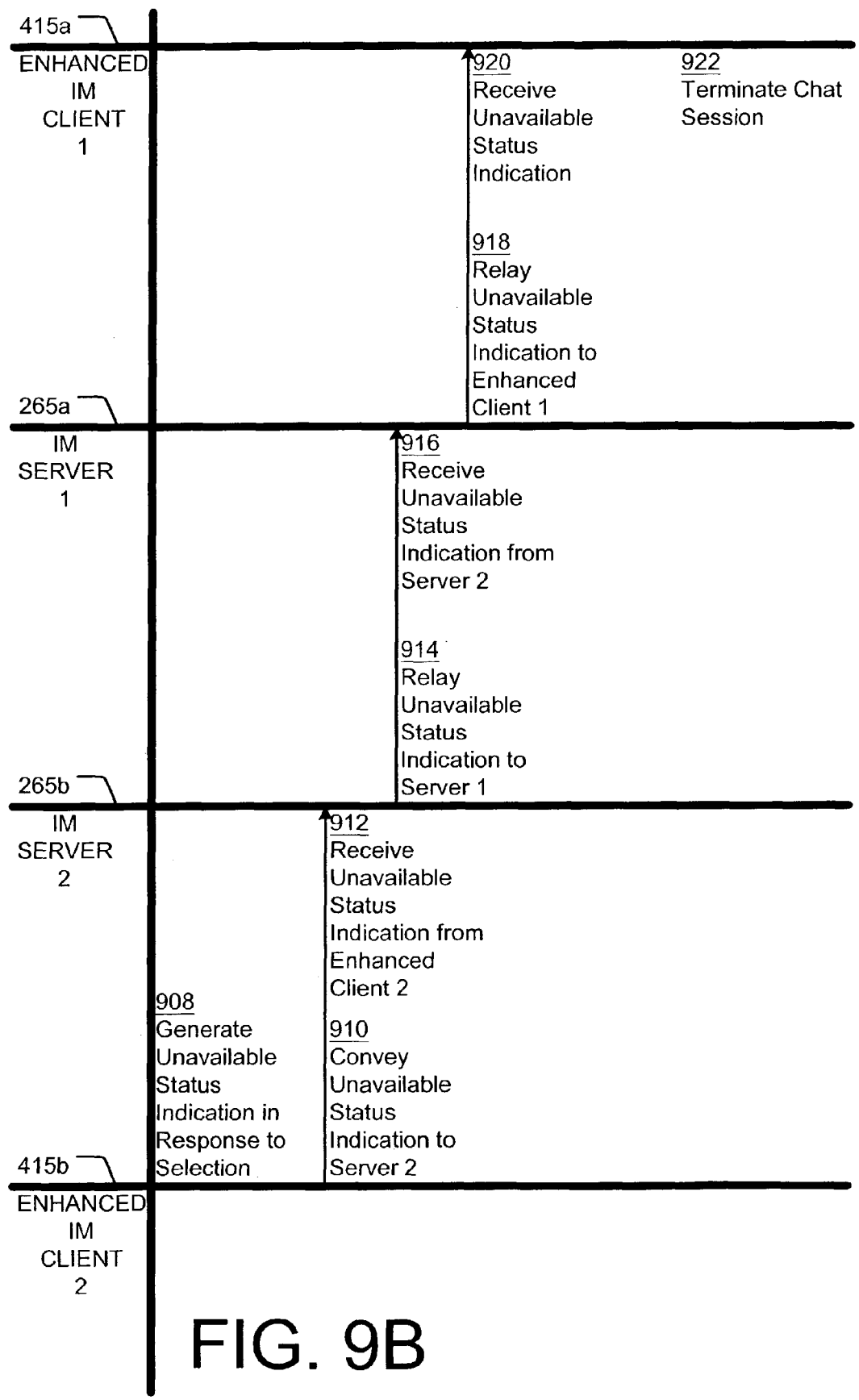

The process continues in FIG. 9B, where the enhanced contact IM client 415*b* generates (908) an indication of unavailable status (hereinafter "unavailable status indication") in response to the selection. The unavailable status indication is conveyed (910) to the contact IM server 265*b*. The contact IM server 265*b* receives (912) the unavailable status indication from the enhanced contact IM client 415*b* and relays (914) the unavailable status indication to the user IM server 265*a*. The user IM server 265*a* receives (916) the unavailable status indication and further relays (918) the unavailable status indication to the enhanced user IM client 415*a*. The enhanced user IM client 415*a* receives (920) the unavailable status indication and terminates (922) the chat session. It should be appreciated that, in other embodiment, no messages may be sent back to the enhanced user IM client 415*a*. Additionally, it should be appreciated that, when the contact selects an "unavailable status" option, no chat window will be opened at the enhanced contact IM client 415*b*.

Thus, as shown in FIGS. 6 through 9B, unlike conventional IM systems, the enhanced contact IM client 415*b* generates a typing notification message prior to opening an IM chat window at the enhanced contact IM client 415*b*. The generating of a typing notification message prior to the opening of the IM chat window permits the contact to preemptively terminate an IM chat session, thereby providing a contact with greater IM functionality.

Figure 6:
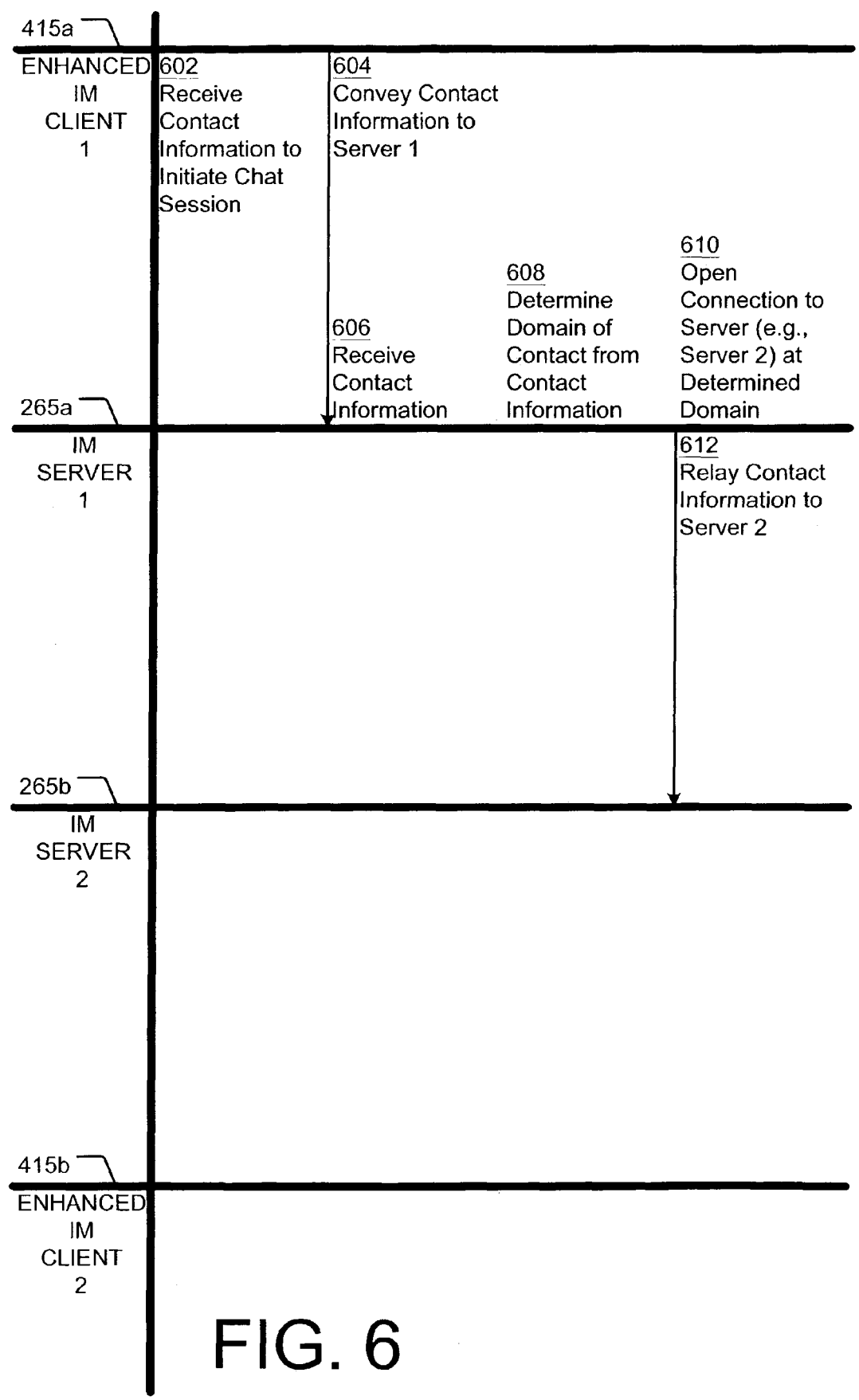

FIGS. 6 through 8, 10A, and 10B are data flow diagrams showing increased IM functionality related to typing notification, in accordance with another embodiment of the invention. Since the processes of FIGS. 6 through 8 have been discussed in detail above, further discussion of FIGS. 6 through 8 is omitted here. However, it should be appreciated that FIGS. 10A and 10B may be processes that continue from the process of FIGS. 6 through 8.

In this regard, continuing in FIG. 10A, the enhanced contact IM client 415*b* receives (650) the event message from the contact IM server 265*b* and generates (902) a typing notification message, which is indicative of typing at the enhanced user IM client 415*a*. The generated (902) typing notification message is displayed (904) to the contact at a pop-up window at the enhanced contact IM client 415b. The pop-up window, in an example embodiment, includes user-selectable options including, for example, an option to ignore IM chat messages from the user at the enhanced user IM client 415a, an option to establish an IM chat session with the enhanced user IM client 415a, an option to change the contact's status to indicate unavailability, and any other option that a developer may wish to include in the enhanced contact IM client 415b. If, for example, the contact selects the option to establish an IM chat session with the user (or a selection indicating that the contact is available), then the enhanced contact IM client 415b receives (1006) the selection from the pop-up window. Thus, unlike the embodiment shown in FIGS. 9A and 9B, the embodiment here does not preemptively terminate the IM chat session.

Figure 10B:
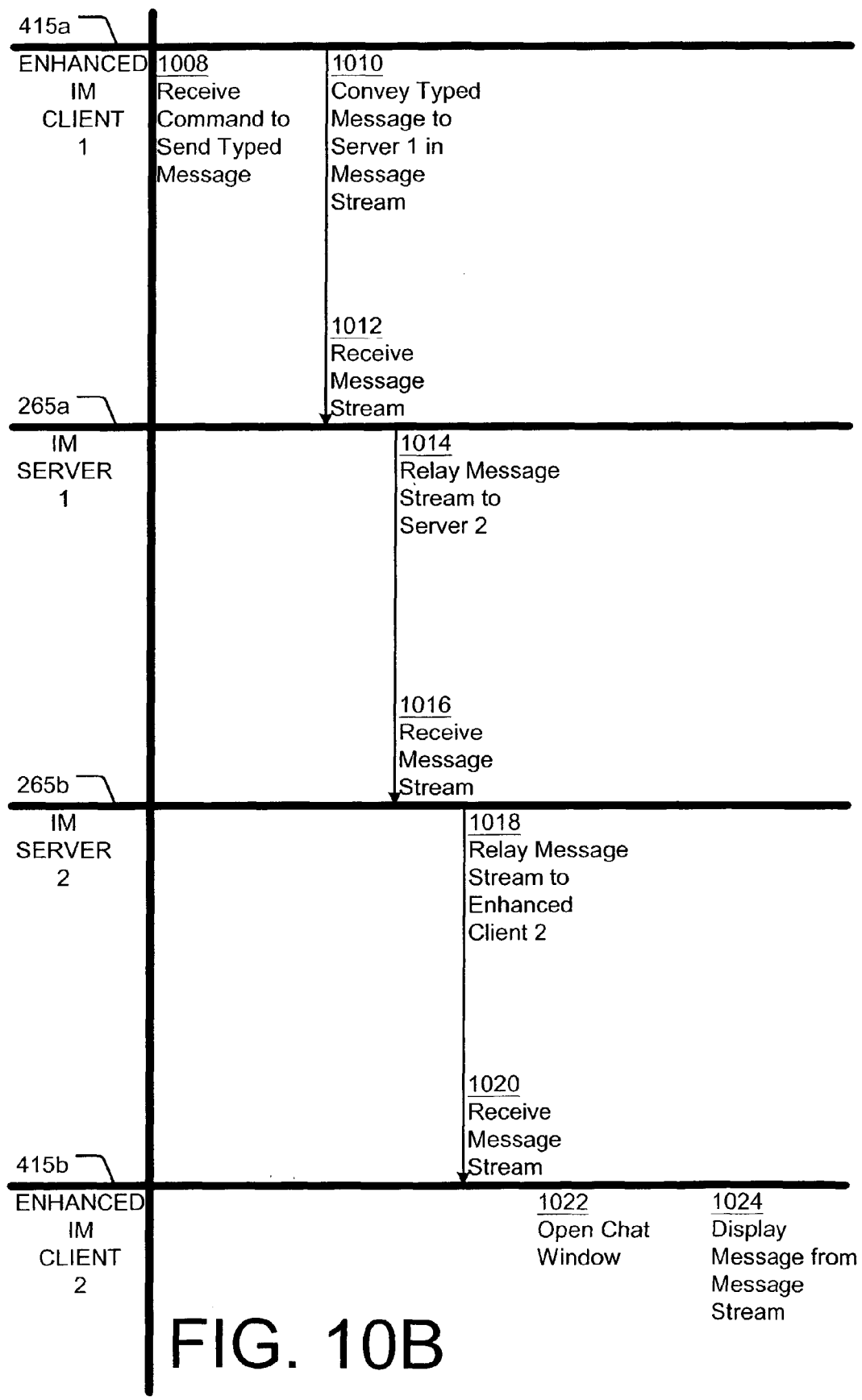

In this regard, as shown in FIG. 10B, when the user at the enhanced user IM client 415a enters a "send" command, the "send" command and the typed message are received (1008) at the enhanced user IM client 415a, which conveys (1010) the typed message to the user IM server 265a in a message stream. The user IM server 265a receives (1012) the message stream and relays (1014) the message stream to the contact IM server 265b. The contact IM server 265b receives (1016) the message stream and relays (1018) the message stream to the enhanced contact IM client 415b. The enhanced contact IM client 415b receives (1020) the message stream and opens (1022) a chat window at which the message from the message stream is displayed (1024).

Thus, as shown in FIGS. 6 through 8, 10A, and 10B, unlike conventional IM systems, the enhanced contact IM client 415b generates a typing notification message prior to opening an IM chat window at the enhanced contact IM client 415b. The generating of the typing notification message prior to the opening of the IM chat window provides more IM options to the contact at the enhanced contact IM client 415b.

FIGS. 6 through 8, 11A, and 11B are data flow diagrams showing increased IM functionality related to typing notification, in accordance with another embodiment of the invention. Since the processes of FIGS. 6 through 8 have been discussed in detail above, further discussion of FIGS. 6 through 8 is omitted here. However, it should be appreciated that FIGS. 11A and 11B may be processes that continue from the process of FIGS. 6 through 8.

Figure 11A:
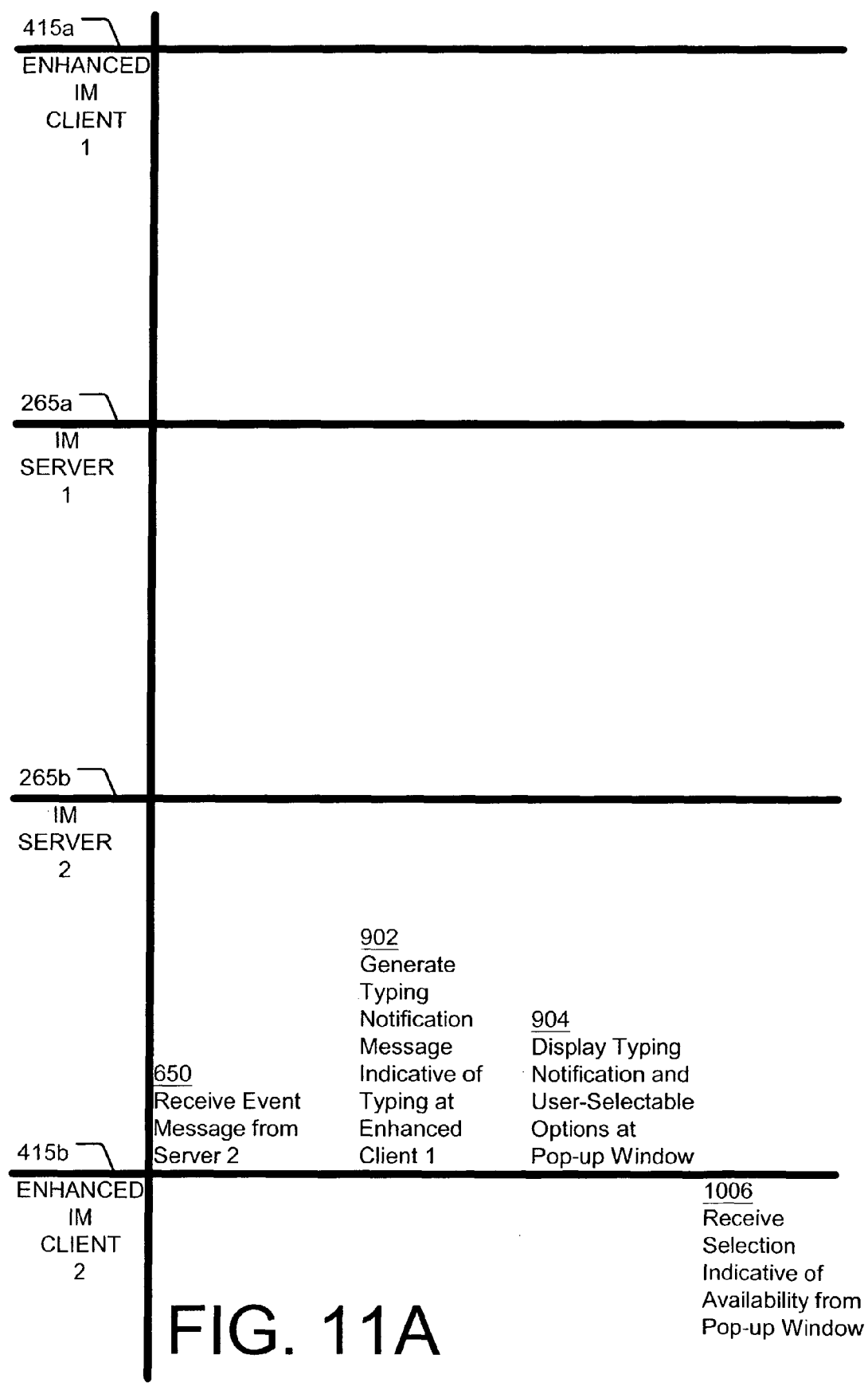

Continuing in FIG. 11A, the enhanced contact IM client 415b receives (650) the event message from the contact IM server 265b and generates (902) a typing notification message, which is indicative of typing at the enhanced user IM client 415a. The generated (902) typing notification message is displayed (904) to the contact at a pop-up window at the enhanced contact IM client 415b. The pop-up window, in an example embodiment, includes user-selectable options including, for example, an option to ignore IM chat messages from the user at the enhanced user IM client 415a, an option to establish an IM chat session with the enhanced user IM client 415a, an option to change the contact's status to indicate unavailability, and any other option that a developer may wish to include in the enhanced contact IM client 415b. If, for example, the contact selects the option to establish an IM chat session with the user (or a selection indicating that the contact is available), then the enhanced contact IM client 415b receives (1006) the selection from the pop-up window. Thus, unlike the embodiment shown in FIGS. 9A and 9B, the embodiment here does not preemptively terminate the IM chat session.

Figure 11B:
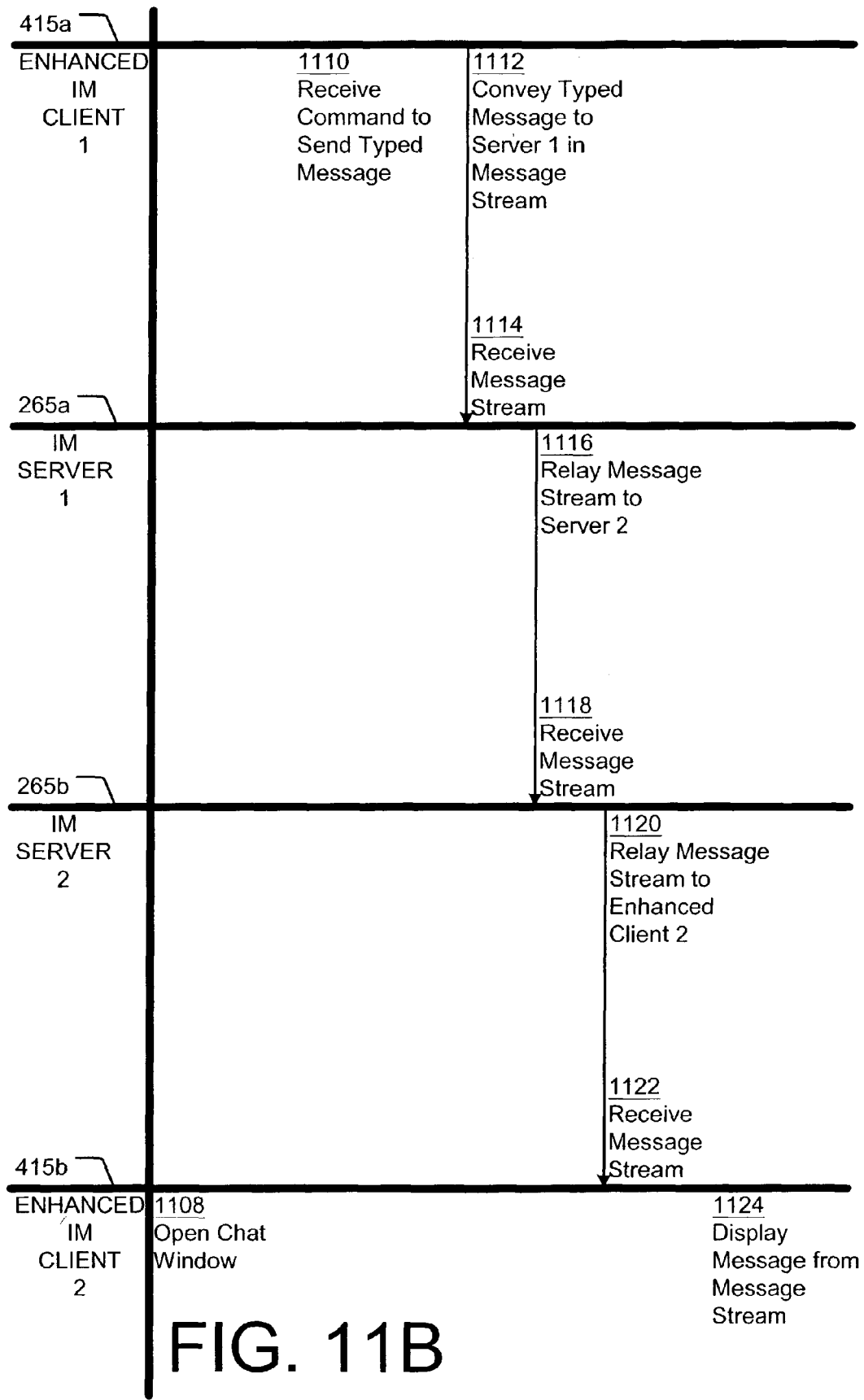

Continuing in FIG. 11B, upon receiving (1006) the selection, the enhanced contact IM client 415b opens (1108) an IM chat window. Thus, unlike the embodiment shown in FIGS. 10A and 10B in which the IM chat window is opened after receiving a message stream, in the embodiment of FIGS. 11A and 11B, the IM chat window is opened (1108) upon receiving the selection indicative of availability. When the user at the enhanced user IM client 415a enters a "send" command, the "send" command and the typed message are received (1110) at the enhanced user IM client 415a, which conveys (1112) the typed message to the user IM server 265a in a message stream. The user IM server 265a receives (114) the message stream and relays (1116) the message stream to the contact IM server 265b. The contact IM server 265b receives (1118) the message stream and relays (1120) the message stream to the enhanced contact IM client 415b. The enhanced contact IM client 415b receives (1122) the message stream and displays (1124) the message from the message stream at the already opened (1108) IM chat window.

Thus, as shown in FIGS. 6 through 8, 11A, and 11B, unlike conventional IM systems, the enhanced contact IM client 415b generates a typing notification message prior to opening an IM chat window at the enhanced contact IM client 415b. The generating of the typing notification message prior to the opening of the IM chat window provides more IM options to the contact at the enhanced contact IM client 415b.

FIGS. 6 through 8, 12A, and 12B are data flow diagrams showing increased IM functionality related to typing notification, in accordance with another embodiment of the invention. Since the processes of FIGS. 6 through 8 have been discussed in detail above, further discussion of FIGS. 6 through 8 is omitted here. However, it should be appreciated that FIGS. 12A and 12B may be processes that continue from the process of FIGS. 6 through 8.

Continuing in FIG. 12A, the enhanced contact IM client 415b receives (650) the event message from the contact IM server 265b and generates (902) a typing notification message, which is indicative of typing at the enhanced user IM client 415a. The generated (902) typing notification message is displayed (904) to the contact at a pop-up window at the enhanced contact IM client 415b. The pop-up window, in an example embodiment, includes user-selectable options including, for example, an option to ignore IM chat messages from the user at the enhanced user IM client 415a, an option to establish an IM chat session with the enhanced user IM client 415a, an option to change the contact's status to indicate unavailability, and any other option that a developer may wish to include in the enhanced contact IM client 415b. If, for example, no option is provided within a finite predetermined time interval (e.g., two seconds, four seconds, etc.), then the enhanced contact IM client 415b indicates (1206) that the contact is available as a default condition.

Figure 12B:
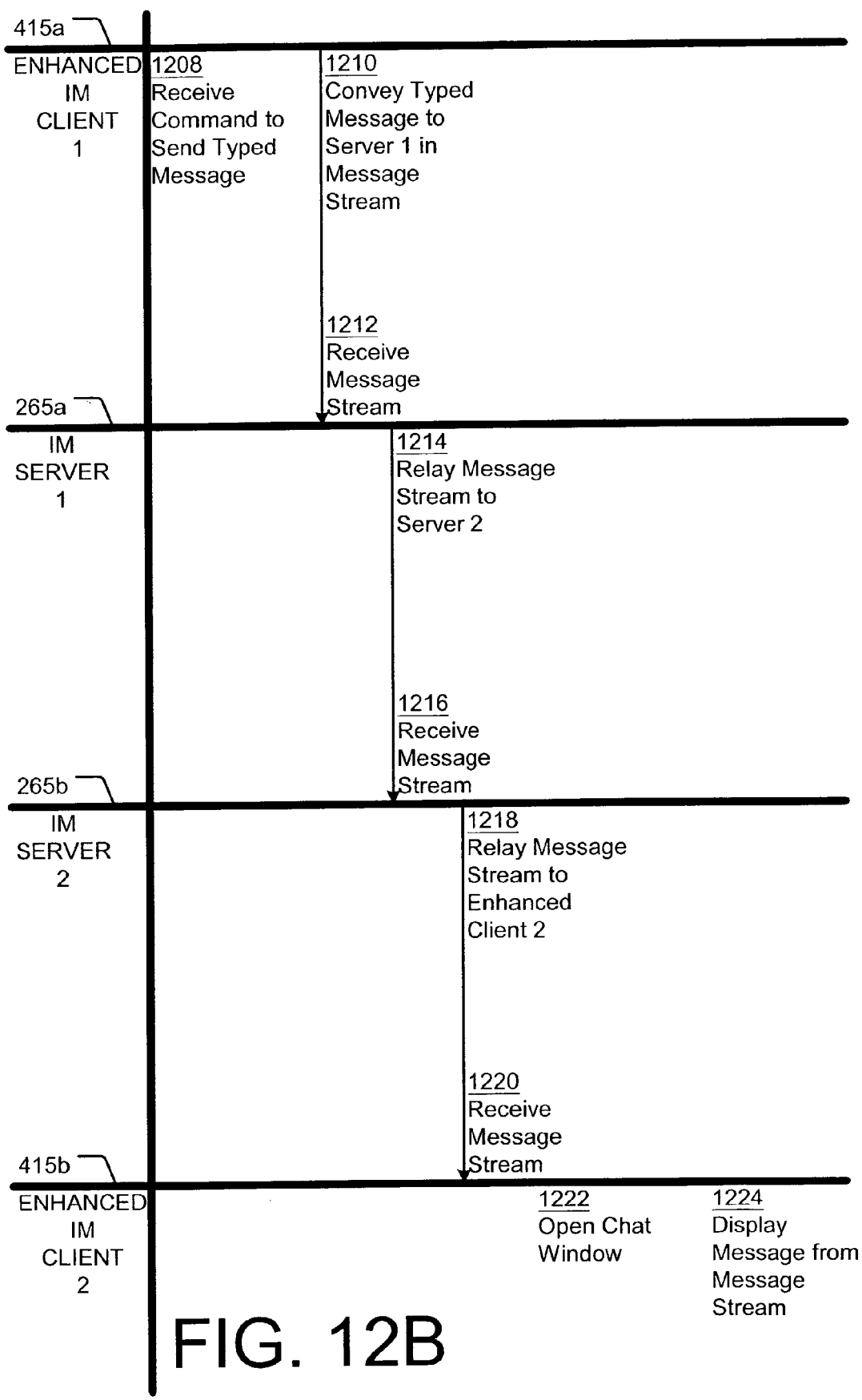

In this regard, as shown in FIG. 12B, when the user at the enhanced user IM client 415a enters a "send" command, the "send" command and the typed message are received (1208) at the enhanced user IM client 415a, which conveys (1210) the typed message to the user IM server 265a in a message stream. The user IM server 265a receives (1212) the message stream and relays (1214) the message stream to the contact IM server 265b. The contact IM server 265b receives (1216) the message stream and relays (1218) the message stream to the enhanced contact IM client 415b. The enhanced contact IM client 415b receives (1220) the message stream and opens (1222) a chat window at which the message from the message stream is displayed (1224).

Thus, as shown in FIGS. 6 through 8, 12A, and 12B, unlike conventional IM systems, the enhanced contact IM client 415b generates a typing notification message prior to opening an IM chat window at the enhanced contact IM client 415b. The generating of the typing notification message prior to the opening of the IM chat window provides more IM options to the contact at the enhanced contact IM client 415b.

FIGS. 6 through 8, 13A, and 13B are data flow diagrams showing increased IM functionality related to typing notification, in accordance with another embodiment of the invention. Since the processes of FIGS. 6 through 8 have been discussed in detail above, further discussion of FIGS. 6 through 8 is omitted here. However, it should be appreciated that FIGS. 13A and 13B may be processes that continue from the process of FIGS. 6 through 8.

Figure 13A:
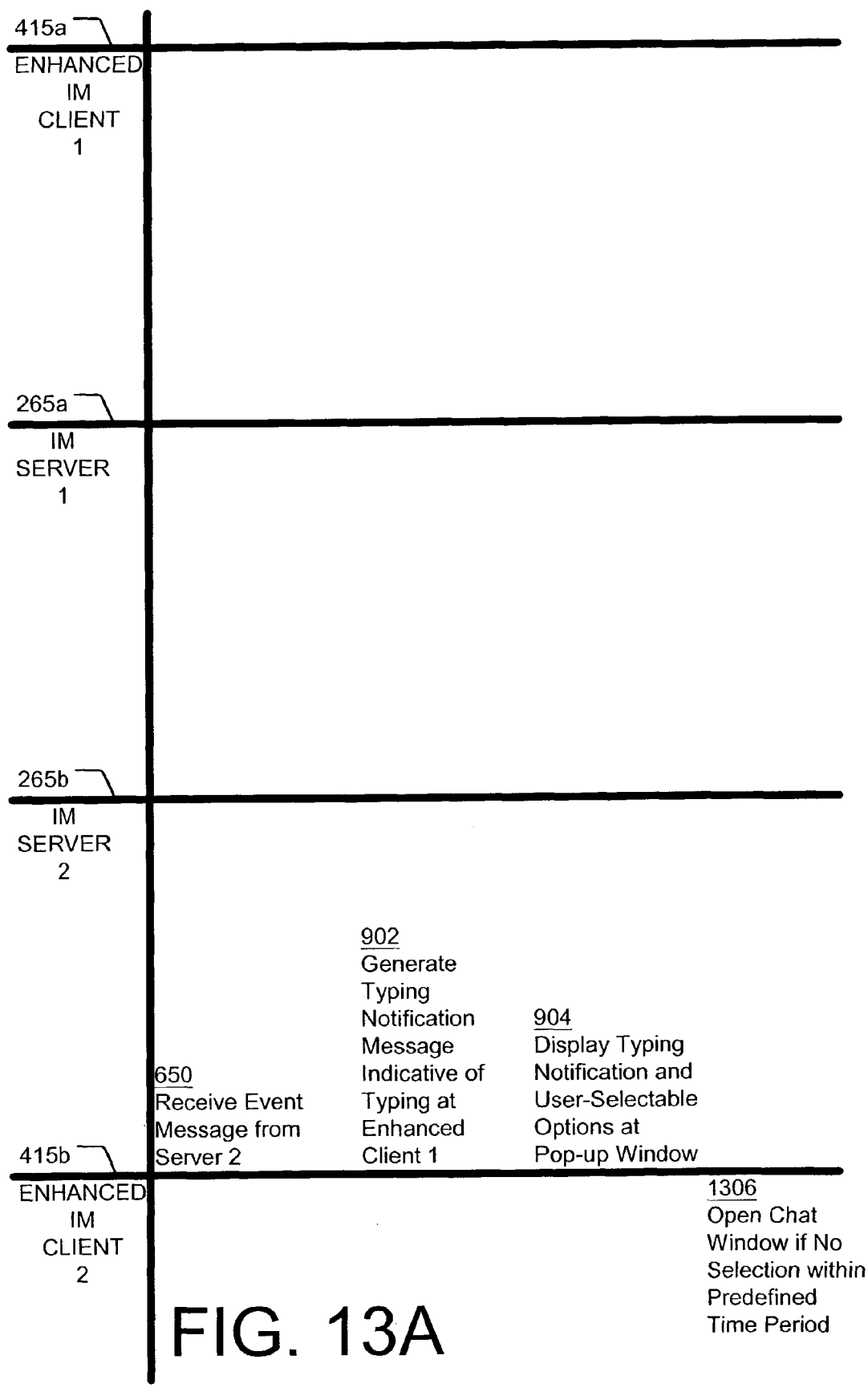

Continuing in FIG. 13A, the enhanced contact IM client 415b receives (650) the event message from the contact IM server 265b and generates (902) a typing notification message, which is indicative of typing at the enhanced user IM client 415a. The generated (902) typing notification message is displayed (904) to the contact at a pop-up window at the enhanced contact IM client 415b. The pop-up window, in an example embodiment, includes user-selectable options including, for example, an option to ignore IM chat messages from the user at the enhanced user IM client 415a, an option to establish an IM chat session with the enhanced user IM client 415a, an option to change the contact's status to indicate unavailability, and any other option that a developer may wish to include in the enhanced contact IM client 415b. If, for example, no option is provided within a finite predetermined time interval, then the enhanced contact IM client 415b opens (1306) an IM chat window. Thus, unlike the embodiment shown in FIGS. 12A and 12B in which the IM chat window is opened (1222) after receiving a message stream, the IM chat window, in the embodiment of FIGS. 13A and 13B, is opened (1306) as a default condition after a finite predetermined time interval.

Figure 13B:
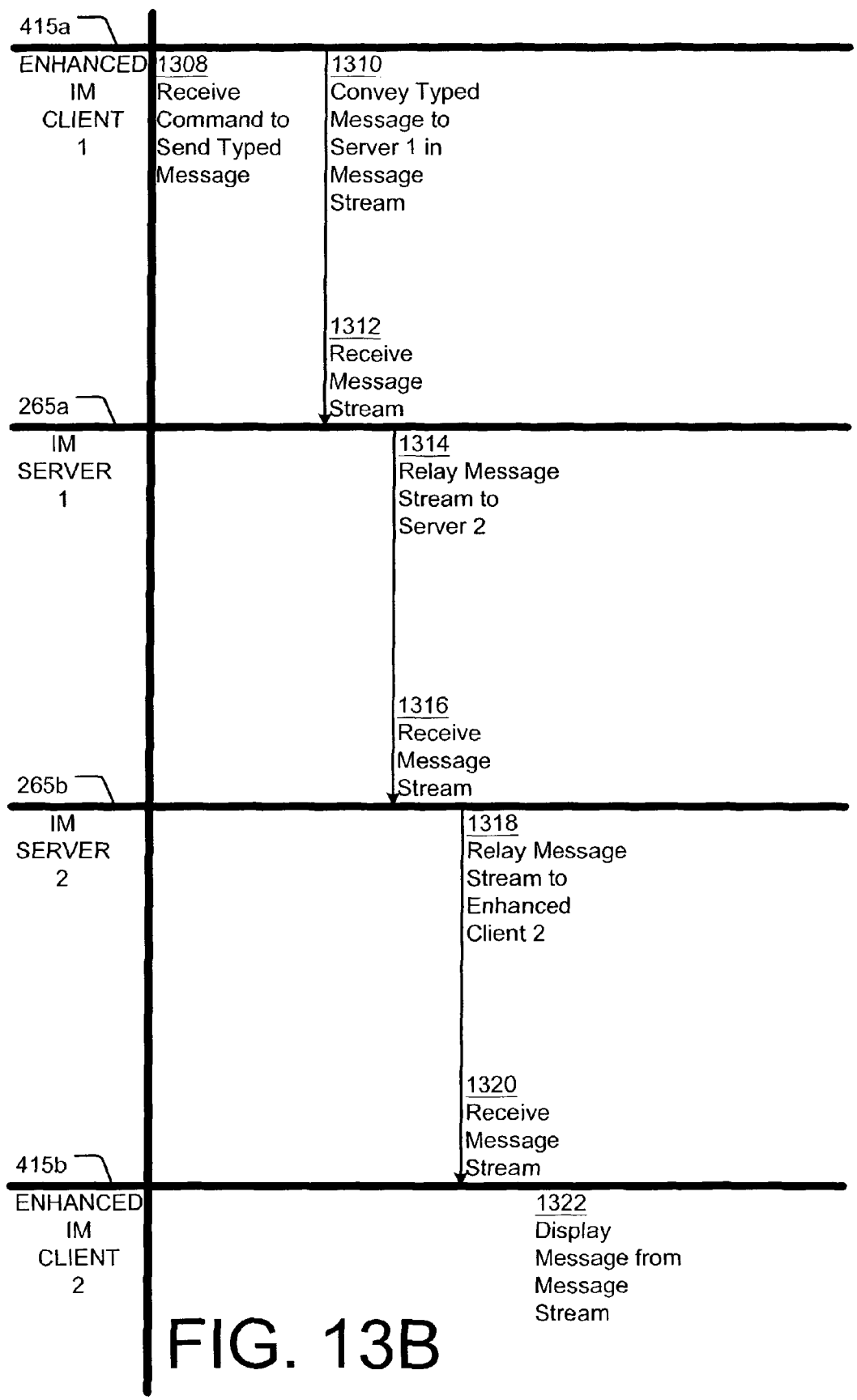

Continuing in FIG. 13B, when the user at the enhanced user IM client 415a enters a "send" command, the "send" command and the typed message are received (1308) at the enhanced user IM client 415a, which conveys (1310) the typed message to the user IM server 265a in a message stream. The user IM server 265a receives (1312) the message stream and relays (1314) the message stream to the contact IM server 265b. The contact IM server 265b receives (1316) the message stream and relays (1318) the message stream to the enhanced contact IM client 415b. The enhanced contact IM client 415b receives (1320) the message stream and displays (1322) the message from the message stream at the already opened (1306) IM chat window.

Thus, as shown in FIGS. 6 through 8, 13A, and 13B, unlike conventional IM systems, the enhanced contact IM client 415b generates a typing notification message prior to opening an IM chat window at the enhanced contact IM client 415b. The generating of the typing notification message prior to the opening of the IM chat window provides more IM options to the contact at the enhanced contact IM client 415b.

FIGS. 6 through 8, 14A, and 14B are data flow diagrams showing increased IM functionality related to typing notification, in accordance with another embodiment of the invention. Since the processes of FIGS. 6 through 8 have been discussed in detail above, further discussion of FIGS. 6 through 8 is omitted here. However, it should be appreciated that FIGS. 14A and 14B may be processes that continue from the process of FIGS. 6 through 8.

Figure 14A:
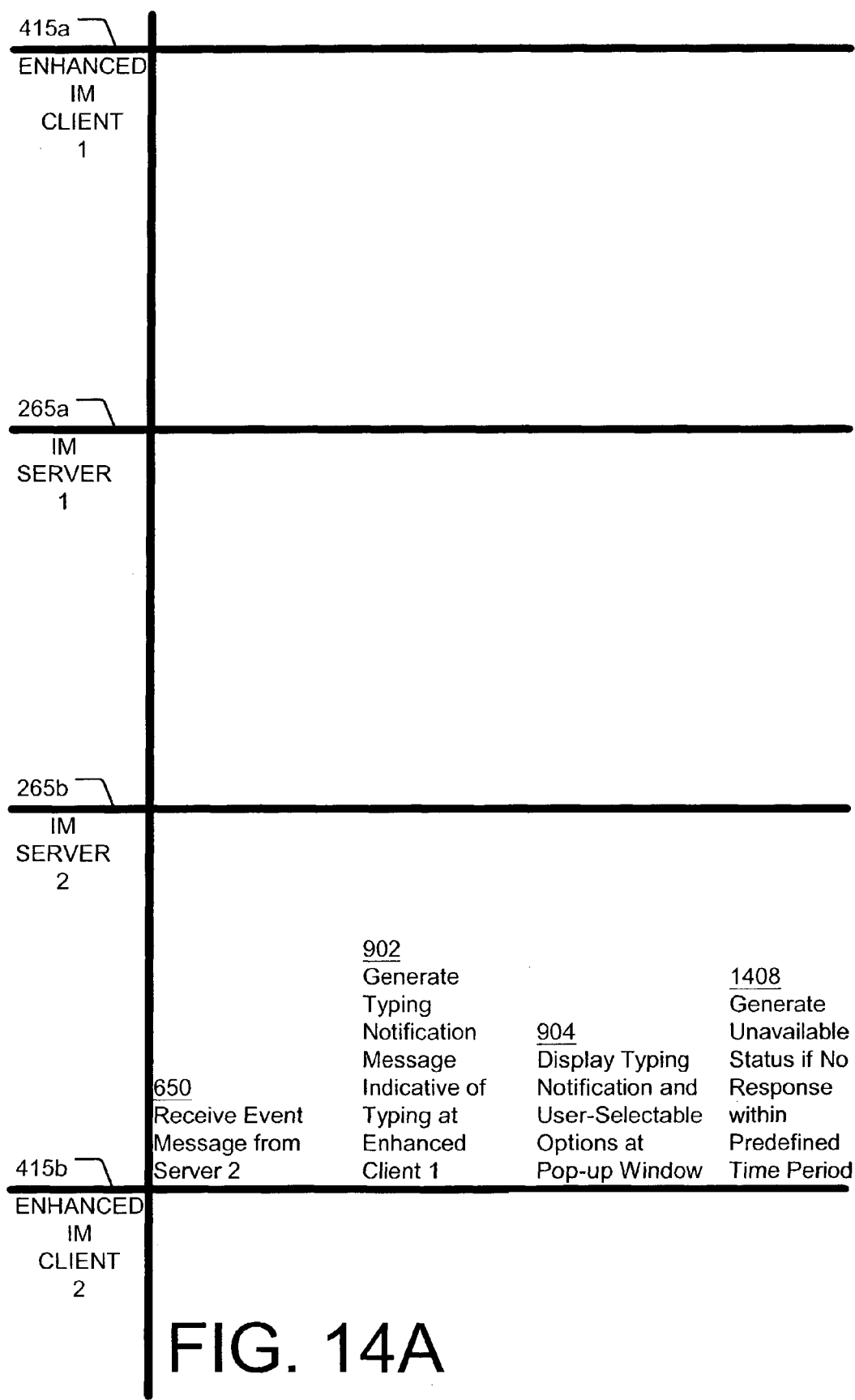

Continuing in FIG. 14A, the enhanced contact IM client 415b receives (650) the event message from the contact IM server 265b and generates (902) a typing notification message, which is indicative of typing at the enhanced user IM client 415a. The generated (902) typing notification message is displayed (904) to the contact at a pop-up window at the enhanced contact IM client 415b. The pop-up window, in an example embodiment, includes user-selectable options including, for example, an option to ignore IM chat messages from the user at the enhanced user IM client 415a, an option to establish an IM chat session with the enhanced user IM client 415a, an option to change the contact's status to indicate unavailability, and any other option that a developer may wish to include in the enhanced contact IM client 415b. If, for example, no option is selected within a finite predetermined time interval, then the enhanced contact IM client 415b generates (1408) an indication of unavailability (hereinafter "unavailable status indication").

Figure 14B:
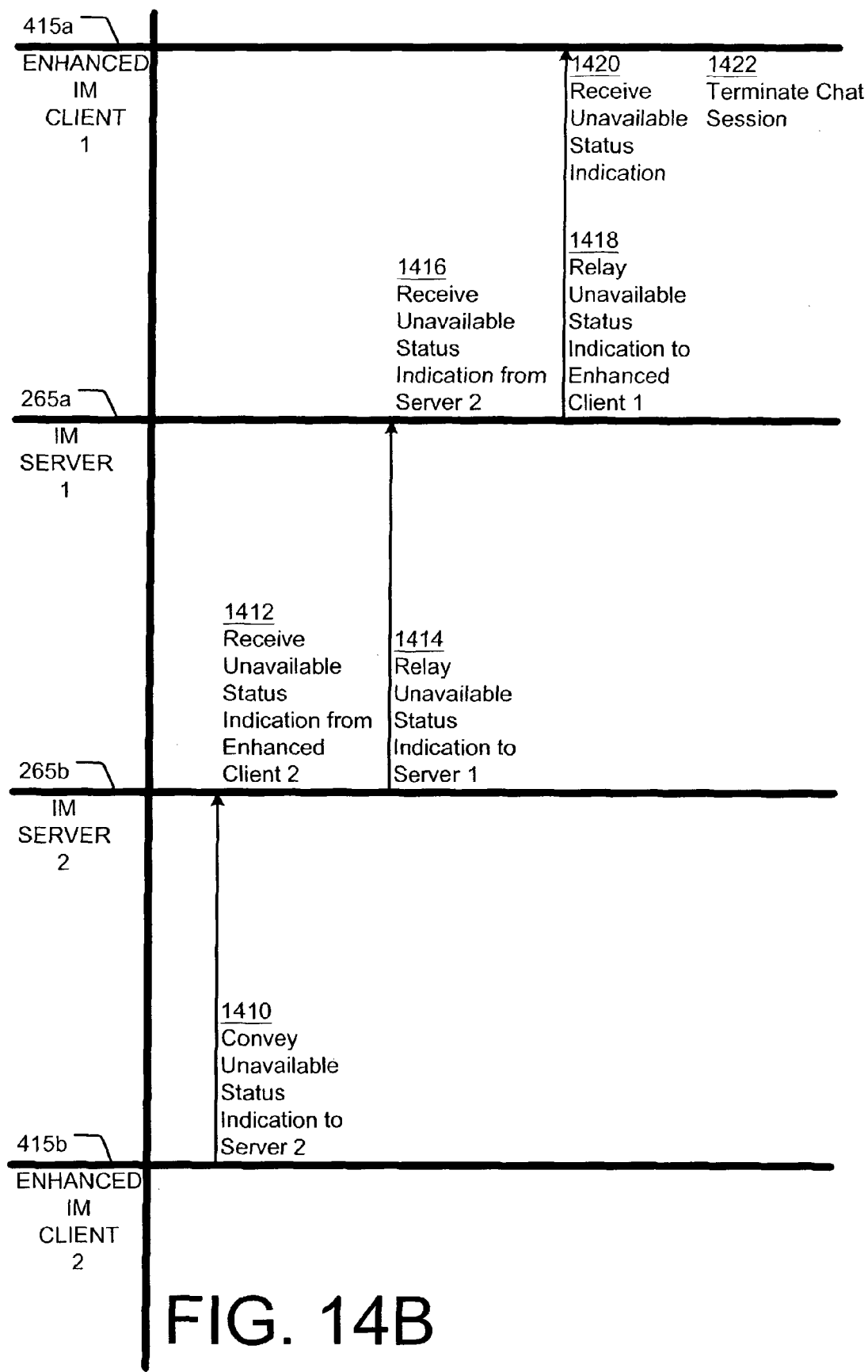

The process continues in FIG. 14B, where the unavailable status indication is conveyed (1410) to the contact IM server 265b. The contact IM server 265b receives (1412) the unavailable status indication from the enhanced contact IM client 415b and relays (1414) the unavailable status indication to the user IM server 265a. The user IM server 265a receives (1416) the unavailable status indication and further relays (1418) the unavailable status indication to the enhanced user IM client 415a. The enhanced user IM client 415a receives (1420) the unavailable status indication and preemptively terminates (1422) the IM chat session.

Thus, as shown in FIGS. 6 through 8, 14A, and 14B, the enhanced contact IM client 415b generates a typing notification message prior to opening an IM chat window at the enhanced contact IM client 415b. Additionally, the enhanced contact IM client 415b preemptively terminates the IM chat session as a default condition if no selection is provided, thereby providing greater IM functionality.

FIGS. 6 and 15 are data flow diagrams showing increased IM functionality related to typing notification, in accordance with another embodiment of the invention. The process begins in FIG. 6 when a user enters contact information to an enhanced user IM client 415a to initiate a chat session. In one embodiment, the user may enter the contact information (e.g., contact login name, domain name, etc.) by selecting a contact from a contact list (e.g., address book, "buddy list," etc.). In another embodiment, the user may enter the contact information in an input box provided by the enhanced user IM client 415a. In any event, the enhanced user IM client 415a receives (602) the contact information and conveys (604) the contact information to a user IM server 265a. The user IM server 265a receives (606) the contact information and determines (608) the appropriate server at which the contact may be located from the domain name in the contact information. Upon determining (608) the contact IM server 265b, a connection is opened (610) to the contact IM server 265b by the user IM server 265a, and the contact information is relayed (612) to the contact IM server 265b.

Continuing in FIG. 15, the contact IM server 265b receives (614) the contact information and queries (616) an enhanced contact IM client 415b in order to validate connection of the contact (e.g., whether the contact is open to receiving IM messages, whether the user is blocked by the contact, etc.). The enhanced contact IM client 415b receives (618) the query and generates (1502) an indication of unavailability if the user at the enhanced user IM client 415a is blocked by the enhanced contact IM client 415b.

Upon generating (1502) the indication of unavailability, the enhanced contact IM client 415b relays (1504) the indication of unavailability to the contact IM server 265b. The contact IM server 265b receives (1506) the indication of unavailability and relays (1508) the indication of unavailability to the user IM server 265a. The user IM server 265a receives (1510) the indication of unavailability and further relays (1512) the indication of unavailability to the enhanced user IM client 415*a*. The user IM client 415*a* receives (1514) the indication of unavailability and preemptively terminates (1516) the IM chat session.

Thus, as seen in the embodiment of FIGS. 6 and 15, if the user is blocked by the enhanced contact IM client 415*b*, then the IM chat session is terminated before any message can be typed at the enhanced user IM client 415*a*. It should also be appreciated that if the user is not blocked by the enhanced contact IM client 415*b*, then the processes shown by the different permutations of FIGS. 6 through 14B may be implemented. Additionally, it should be appreciated that other status settings (e.g., away, not available, busy, etc.) may be implemented on a user-by-user or contact-by-contact basis. In other words, the status setting for each contact or user may be individually set so that incoming messages are treated differently for each contact or user. For example, one user may have a blocked status as a default setting, in which case the process of FIGS. 6 and 15 would be implemented for that user. Another user may have an available status as a default setting, in which case the processes outlined by the different permutations of FIGS. 6 through 14B may be implemented for that user.

As shown in FIGS. 6 through 15, greater functionality is available at enhanced IM clients 415*a*, 415*b* by providing a typing notification message prior to opening an IM chat window. While several embodiments are shown with reference to FIGS. 6 through 15, it should be appreciated that the options shown in FIGS. 6 through 15 may be combined in different permutations to provide greater flexibility and functionality at the enhanced IM clients 415*a*, 415*b*.

Figure 16:
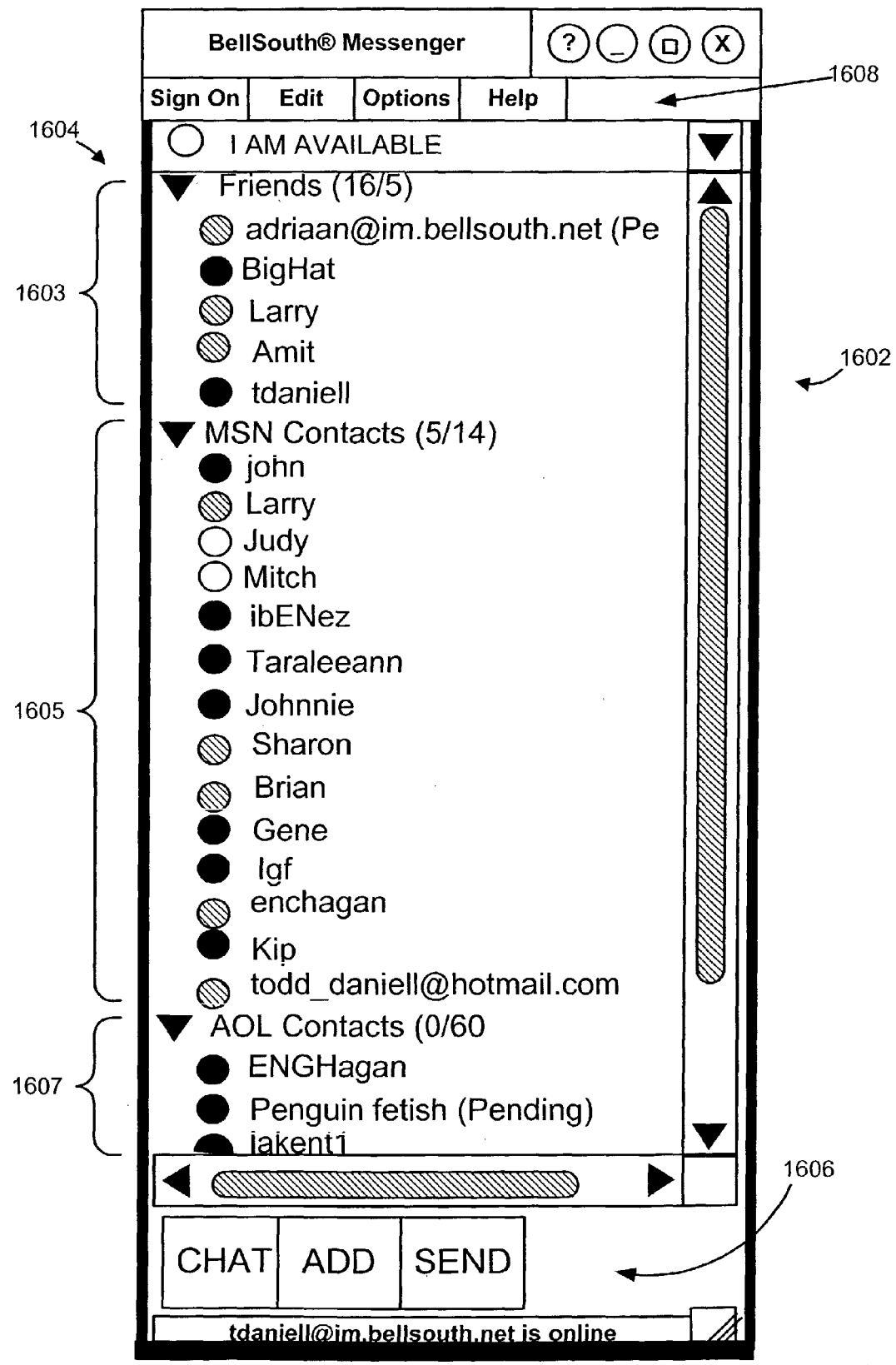
FIG. 16 is a diagram showing one embodiment of a user interface for an enhanced IM client.

FIG. 16 is a diagram showing one embodiment of a user interface 1602 for an enhanced IM client 415. As shown in FIG. 16, the example user interface 1602 includes a list of contacts 1604, which may be categorized as desired by a user. Specifically, the embodiment of FIG. 16 shows the list of contacts 1604 being categorized according to each contact's IM account. Thus, for example, the contacts having Microsoft (MSN) IM accounts 1605 are grouped together, the contacts having America On-Line (AOL) IM accounts 1607 are grouped together, etc. Additionally, the status (e.g., available, not online, busy, etc.) of each contact is provided at the user interface 1602. The functionality of the IM user interface 1602 is described in greater detail in co-pending U.S. patent application Ser. Nos. 10/274,408 and 10/325,268, which are incorporated herein by reference in its entirety. Thus, further discussion of the IM user interface 1602 is omitted here. However, it should be appreciated that a user may select an "available" contact to initiate an IM chat session. Hence, an IM chat window may be opened in response to selecting an "available" contact by the user. An example IM chat window is shown in FIG. 17.

Figure 17:
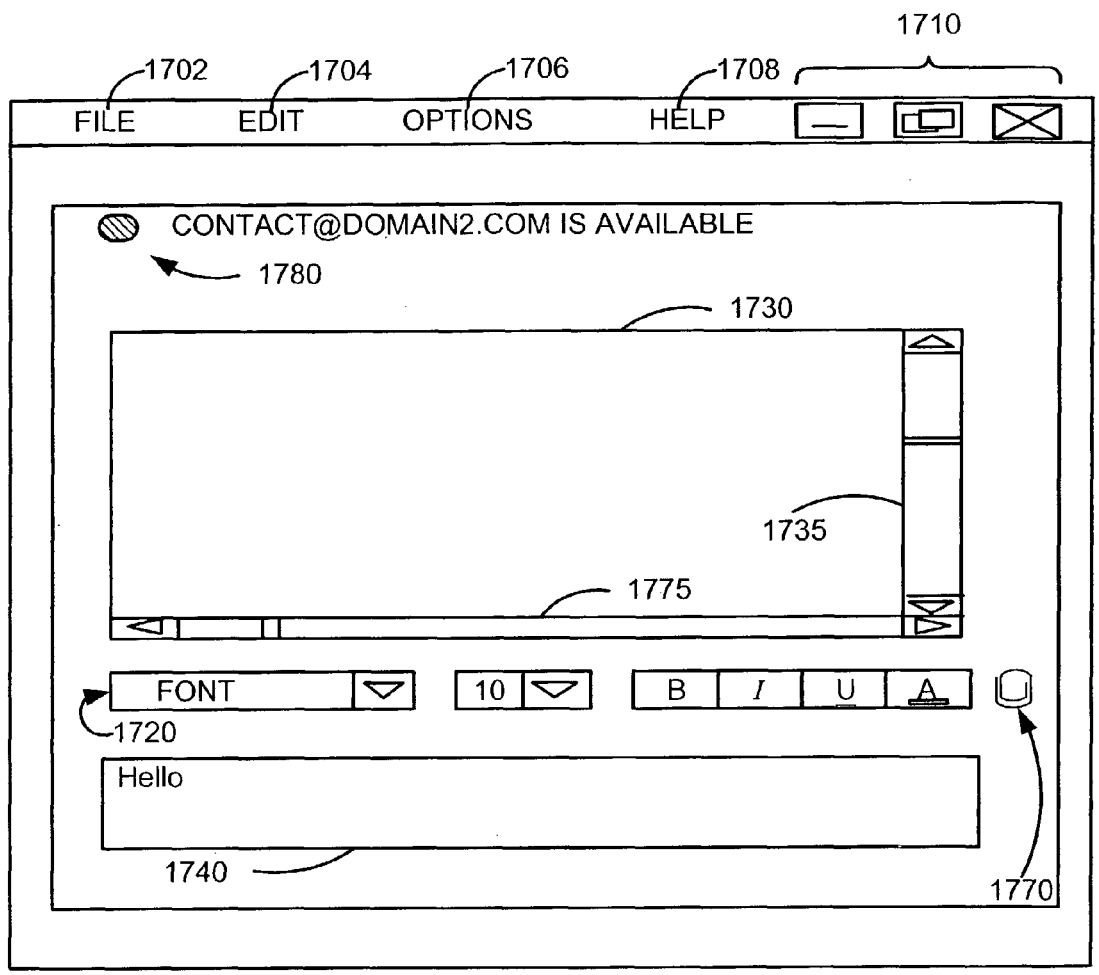
FIG. 17 is a diagram showing one embodiment of a chat window for an enhanced IM client.

FIG. 17 is a diagram showing one embodiment of an IM chat window for an enhanced IM client 415. As shown in FIG. 17, when the user selects a contact for an IM chat session and an IM chat window is opened in response to the selection, an indication of availability 1780 is displayed to the user. If, as described with reference to FIGS. 10A through 13B, the contact selects the option to indicate availability, or if "available" is the default condition, then the indication of availability remains unchanged while the user initiates the IM chat session. However, as described with reference to FIGS. 9A, 9B, and 14A through 15, if the contact selects the option to indicate unavailability, or if "unavailable" is the default condition, then the indication of availability 1780 changes to an indication of unavailability (not shown). The change in the indication notifies the user that the contact is not responding to the user's IM chat session.

Figure 18:
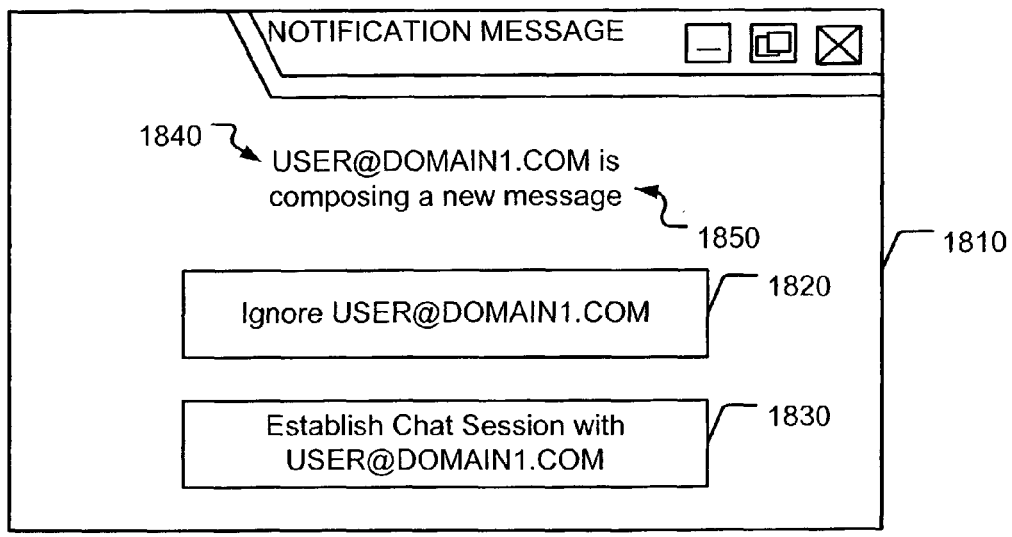
FIG. 18 is a diagram showing one embodiment of an advanced IM notification.

FIG. 18 is a diagram showing one embodiment of a notification message 1810 displayed prior to opening an IM chat window. As shown in FIG. 18, the notification message 1810 provides an option 1820 to ignore IM chat messages from the user at the user IM client (hereinafter "the ignore option" 1820). Thus, as described with reference to FIGS. 9A, 9B, and 14A through 15, if the user selects the ignore option 1820, then the indication of availability may change, as described with reference to FIG. 17. The notification message 1810 also provides an option 1830 to establish an IM chat session with the user IM client (hereinafter "the establish-chat option" 1830). Thus, as described with reference to FIGS. 10A through 13B, if the user selects the establish-chat option 1830, then the indication of availability will, in one embodiment, remain unchanged. Additionally, as shown in FIG. 18, the notification message 1810 may include an IM address 1840 that identifies the person that is initiating the chat session. While an IM address is shown in FIG. 18, it should be appreciated that a name, an IP address, or any other identifier may be displayed to the contact at the enhanced contact IM client 415*b*. Moreover, the notification message 1810 may also include a content identifier 1850 that indicates that the person initiating the chat session is typing a message. However, it should be appreciated that the enhanced contact IM client 415*b* may be configured to display other content identifiers such as, for example, an indication that the user is attempting to initiate a chat session, the user has selected the contact for a chat session, etc.

The enhanced IM clients 415*a*, 415*b* of the present invention can be implemented in hardware, software, firmware, or a combination thereof. In the preferred embodiment(s), the enhanced IM clients 415*a*, 415*b* are implemented in software or firmware that is stored in a memory and that is executed by a suitable instruction execution system. If implemented in hardware, as in an alternative embodiment, the enhanced IM clients 415*a*, 415*b* can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or steps in data flow diagrams (e.g., FIGS. 6 through 15) should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although exemplary embodiments have been shown and described, it will be clear to those of ordinary skill in the art that a number of changes, modifications, or alterations may be made, none of which depart from the spirit of the present invention. For example, while all embodiments show the enhanced user IM client 415*a* as initiating all IM chat sessions, it should be understood that the enhanced contact IM client 415*b* may initiate the IM chat sessions in other embodiments. For those embodiments, it should be appreciated that the process may be similar to the processes outlined in FIGS. 6 through 15. Also, while both the user and contact clients are shown to be enhanced IM clients 415*a*, 415*b*, it should be appreciated that the message initiator's IM client need not have the added functionality as described with reference to FIGS. 4A through 18. Additionally, while server-to-server embodiments are shown in FIGS. 6 through 15, it should be appreciated that a substantially similar process may be utilized in a client-to-client embodiments. Similarly, it should be appreciated that, rather than traversing two servers 265a, 265b, a single server may be the host to both enhanced IM clients 415a, 415b. Also, while only two status conditions (e.g., "blocked" and "not blocked") of a user are provided in the embodiments of FIGS. 6 through 15, it should be appreciated that several other status conditions (e.g., "query for further options," etc.) may also be included as desired. It should also be appreciated by those of skill in the art that the status conditions may be saved at the client location through an "options" menu on the enhanced IM client. Since the setting of options at an IM client are known in the art, further discussion of the implementation of status conditions is omitted here. While a typing notification is specifically taught above, it should be appreciated that any event message that is indicative of a user's intent to initiate a chat session may be used to trigger a notification message at the enhanced IM client. In this regard, these and all such changes, modifications, and alterations should be seen as being within the scope of the present invention.

What is claimed is:

1. In an instant messaging (IM) system in which a user at a user instant messaging (IM) client initiates an IM chat session with a contact at a contact IM client, a method comprising:
   receiving an event message at the contact IM client, the event message being received prior to opening an IM chat window at the contact IM client, the event message being indicative of typing of a message of the user being currently typed at the user IM client;
   determining whether a status of the user is blocked;
   generating a typing notification message, the typing notification message being indicative of typing by the user at the user IM client; and
   providing the typing notification message in a display at the contact IM client, the typing notification message configured to provide the message of the user being currently typed, the typing notification message including a user-selectable option to ignore the user's message being currently typed, wherein, when the contact selects the user-selectable option to ignore the user's message being currently typed, changing an availability status of the contact to unavailable, sending an unavailability status indication from the contact to the user currently typing said message and terminating the IM chat session,
   the typing notification message including a close option to close the typing notification message, the close option being different than the user-selectable option to ignore the message of the user being currently typed, the typing notification message being configured to indicate when the contact is selected as a recipient of the instant message, the typing notification message being displayed prior to display of the IM chat window.

2. The method of claim 1, further comprising generating a reply message in response to determining that the status of the user is blocked, the reply message indicating that the contact IM client is not receiving IM chat messages from the user at the user IM client.

3. The method of claim 1, further comprising establishing an IM chat session with the user IM client in response to determining that the status of the user is not blocked.

4. The method of claim 1, wherein the typing notification message is configured to provide a user-selectable option to establish an IM chat session with the user IM client.

5. A method comprising:
   receiving an event message at a first instant messaging (IM) client, the event message being responsive to a designation of a potential chat session with the first IM client from a second IM client; and
   providing for display a notification message at the first IM client in response to receiving the event message prior to display of an IM chat window, the notification message including a user-selectable option to ignore the event message, wherein, when the first IM client selects the user-selectable option to ignore the event message, changing an availability status of a user associated with the first IM client to unavailable, sending an unavailability status indication from the first IM client to the second IM client and terminating the IM chat session,
   the notification message including a close option to close the notification message, the close option being different than the user-selectable option to ignore the event message, the notification message being configured to indicate when a contact is selected as a recipient of the instant message,
   wherein the event message is indicative of an action at the second IM client.

6. The method of claim 5, further comprising generating a reply message in response to a determination that the user associated with the first IM client is currently in a blocked status, the reply message indicating that the contact IM client is not receiving IM chat messages from the user at the user IM client.

7. The system of claim 5, further comprising establishing an IM chat session with the user IM client in response to a determination that the user associated with the first IM client is currently not in a blocked status.

8. The method of claim 5, wherein the event message is configured to provide an option, the option including
   an option to establish an IM chat session with the user IM client; and
   providing for display the generated typing notification message at the contact IM client.

9. The method of claim 5, wherein the event message includes a text message.

10. The method of claim 5, wherein the event message includes contact information of a contact, the contact initiating a chat session at a second IM client.

11. The method of claim 10, wherein the contact information includes a name.

12. The method of claim 10, wherein the contact information includes an IM address.

13. The method of claim 5, wherein the providing the vent message for display includes providing an option to ignore messages from the second IM client.

14. The method of claim 13, further comprising:
   receiving no selection of the option for a predefined time interval; and
   establishing an IM chat session with the second IM client in response to receiving no selection of the option for the predefined time interval.

15. The method of claim 13, further comprising:
   receiving no selection of the option for a predefined time interval; and
   generating a reply message in response to receiving no selection of the option, the reply message indicating that the first IM client is not receiving IM chat messages from the second IM client.

16. The method of claim 5, further comprising receiving a selection of the option to ignore messages from the second IM client.

17. The method of claim 16, further comprising generating a reply message in response to the selection of the option to ignore messages from the second IM client, the reply message indicating that the first IM client is not receiving IM chat messages from the second IM client.

18. The method of claim 5, wherein the providing the event message for display comprises providing an option to establish an IM chat session with the second IM client.

19. The method of claim 18, further comprising receiving a selection of the option to establish an IM chat with the second IM client.

20. The method of claim 19, further comprising establishing an IM chat session with the second IM client in response to the selection of the option to establish an IM chat with the second IM client.

21. The method of claim 18, further comprising:
receiving no selection of the option for a predefined time interval; and
establishing an IM chat session with the second IM client in response to receiving no selection of the option for the predefined time interval.

22. The method of claim 18, further comprising:
receiving no selection of the option for a predefined time interval; and
generating a reply message in response to receiving no selection of the option, the reply message indicating that the first IM client is not receiving IM chat messages from the second IM client.

23. A method comprising:
receiving an event message at a first instant messaging (IM) client, the event message being received prior to opening a IM chat window at the first IM client, the event message being indicative of typing by a user at a second IM client;
determining whether a status of the user at the second IM client is blocked; and
providing for display a notification message at the first IM client, the notification message being displayed prior to opening the IM chat window, the notification message including a user-selectable option to ignore the event message, wherein, when the first IM client selects the user-selectable option to ignore the event message, changing an availability status of a user associated with the first IM client to unavailable, sending an unavailability status indication from the first IM client to the second IM client and terminating the IM chat session,
the notification message including a close option to close the notification message, the close option being different than the user-selectable option to ignore the event message, the notification message being configured to indicate when a contact is selected as a recipient of the instant message.

24. The method of claim 23, further comprising:
generating a reply message in response to determining that the status of the user at the second IM client is a blocked status, the reply message indicating that the first IM client is not receiving IM chat messages from the user at the second IM client.

25. The method of claim 23, further comprising establishing an IM chat session with the second IM client in response to determining that the status of the user at the second IM client is a not-blocked status.

26. The method of claim 23, wherein the displaying the notification message comprises an option to establish an IM chat session with the second IM client.

27. The method of claim 26, further comprising receiving a selection of the option in response to providing the option, the selection of the option being selected from a group including at least one of the following:
a selection of the option to ignore messages from the second IM client;
a selection of the option to establish an IM chat with the second IM client.

28. The method of claim 27, further comprising generating a reply message in response to the selection of the option to ignore messages from the second IM client, the reply message indicating that the first IM client is not receiving IM chat messages from the second IM client.

29. The method of claim 27, further comprising establishing an IM chat session with the second IM client in response to the selection of the option to establish an IM chat with the second IM client.

30. The method of claim 27, further comprising:
receiving no selection of the option for a predefined time interval; and
establishing an IM chat session with the second IM client in response to receiving no selection of the option for the predefined time interval.

31. The method of claim 27, further comprising:
receiving no selection of the option for a predefined time interval; and generating a reply message in response to receiving no selection of the option,
the reply message indicating that the first IM client is not receiving IM chat messages from the second IM client.

32. A first IM client comprising:
a processor; and
a memory configured to store:
logic adapted to receive an event message, the event message being received prior to opening an IM chat window at the first IM client, the event message being indicative of typing by a user at a second IM client;
logic adapted to determine whether a status of the user at the second IM client is blocked; and
logic adapted to provide for display a notification message at the first IM client prior to opening an IM chat window, the notification message including a user-selectable option to ignore the event message, wherein, when the first IM client selects the user-selectable option to ignore the event message, changing an availability status of a user associated with the first IM client to unavailable, sending an unavailability status indication from the first IM client to the second IM client and terminating the IM chat session, the notification message including a close option to close the notification message, the close option being different than the user-selectable option to ignore the event message, the notification message being configured to indicate when a contact is selected as a recipient of the instant message.

33. The first IM client of claim 32, wherein the logic adapted to provide for display the typing notification message comprises logic adapted to provide for display the typing notification message prior to opening the IM chat window.

34. The first IM client of claim 32, wherein the memory is further configured to store logic adapted to establish an IM chat session with the second IM client in response to determining that the status of the user is a not-blocked status.

35. The first IM client of claim 32, wherein the memory is further configured to store logic adapted to generate a reply message in response to determining that the status of the user is a blocked status, the reply message indicating that the first IM client is not receiving IM chat messages from the user at the second IM client.

36. The first IM client of claim 32, wherein the logic adapted to provide for display the typing notification message comprises logic adapted to provide an option to establish an IM chat session with the second IM client.

37. The first IM client of claim 36, wherein the memory is further configured to store logic adapted to receive a selection of the option in response to providing the option, the selection of the option being one selected from a group consisting of:
   a selection of the option to ignore messages from the second IM client;
   selection of the option to establish an IM chat with the second IM client.

38. The first IM client of claim 37, wherein the memory is further configured to store logic adapted to generate a reply message in response to the selection of the option to ignore messages from the second IM client, the reply message indicating that the first IM client is not receiving IM chat messages from the second IM client.

39. The first IM client of claim 37, wherein the memory is further configured to store logic adapted to establish an IM chat session with the second IM client in response to the selection of the option to establish an IM chat with the second IM client.

40. The first IM client of claim 36, wherein the memory is further configured to store logic adapted to establish an IM chat session with the second IM client in response to receiving no selection of the option for the predefined time interval.

41. The first IM client of claim 36, wherein the memory is further configured to store logic adapted to generate a reply message in response to receiving no selection of the option, the reply message indicating that the first IM client is not receiving IM chat messages from the second IM client.

* * * * *